United States Patent
Liu et al.

(10) Patent No.: US 12,517,633 B2
(45) Date of Patent: Jan. 6, 2026

(54) MULTI-WINDOW DISPLAY TERMINAL DEVICE AND METHOD

(71) Applicant: Honor Device Co., Ltd., Shenzhen (CN)

(72) Inventors: Weijie Liu, Shenzhen (CN); Xia Wu, Shenzhen (CN); Jing Ni, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 366 days.

(21) Appl. No.: 18/027,725

(22) PCT Filed: Apr. 28, 2022

(86) PCT No.: PCT/CN2022/089762
§ 371 (c)(1),
(2) Date: Mar. 22, 2023

(87) PCT Pub. No.: WO2022/228501
PCT Pub. Date: Nov. 3, 2022

(65) Prior Publication Data
US 2023/0376184 A1    Nov. 23, 2023

(30) Foreign Application Priority Data

Apr. 30, 2021   (CN) ......................... 202110484712.5

(51) Int. Cl.
*G06F 1/16* (2006.01)
*G06F 3/04842* (2022.01)
*H04M 1/02* (2006.01)

(52) U.S. Cl.
CPC ........ *G06F 3/04842* (2013.01); *G06F 1/1641* (2013.01); *G06F 1/1647* (2013.01);
(Continued)

(58) Field of Classification Search
None
See application file for complete search history.

(56) References Cited

U.S. PATENT DOCUMENTS 9,489,080 B2 *  11/2016  Seo ..................... G06F 3/04845
10,061,771 B1 *  8/2018  Zhang ..................... G06F 40/58
(Continued)

FOREIGN PATENT DOCUMENTS

CN    107341418 A    11/2017
CN    109067981 A    12/2018
(Continued)

OTHER PUBLICATIONS

Jiang, X. "Patent overview of interactive display technology based on folding screens", China New Telecommunications, Jul. 5, 2020, 7 pages.

*Primary Examiner* — Jerry Wu
*Assistant Examiner* — Rashen E Morrison
(74) *Attorney, Agent, or Firm* — Slater Matsil, LLP

(57) ABSTRACT

Embodiments of this application provide a multi-window display terminal device and method. The terminal device includes: two displays and two cameras that are respectively located on different sides, a microphone, and a processor. The terminal device may determine a display used by a user by using images collected by the two cameras, to adjust a position of a window, so that a front-rear display technology of the display can be implemented. The terminal device may also determine a distance between the user and the terminal device by using the images collected by the two cameras, to adjust a size and/or position of the window based on the distance of the user. The terminal device may also collect a sound of the user by using the microphone, to identify the user's needs and adjust a size and/or position of the window based on the user's needs.

19 Claims, 26 Drawing Sheets

(52) U.S. Cl.
CPC .......... *G06F 1/1652* (2013.01); *G06F 1/1686* (2013.01); *H04M 1/0222* (2013.01); *H04M 1/0264* (2013.01); *H04M 1/0268* (2013.01); *G06F 2203/04803* (2013.01); *H04M 2250/58* (2013.01); *H04M 2250/74* (2013.01)

(56) References Cited

U.S. PATENT DOCUMENTS

| | | | | |
|---|---|---|---|---|
| 11,262,800 | B2* | 3/2022 | Kim | G06F 1/1677 |
| 11,550,531 | B2* | 1/2023 | Vigna | G06F 3/1423 |
| 11,561,589 | B2* | 1/2023 | Palmor | G06F 3/0418 |
| 11,748,508 | B2* | 9/2023 | Luo | G06F 21/6245 726/26 |
| 11,811,961 | B2 | 11/2023 | Zhang et al. | |
| 11,849,201 | B2* | 12/2023 | Lee | H04M 1/0243 |
| 2017/0249300 | A1 | 8/2017 | Cuthbert et al. | |
| 2018/0130447 | A1 | 5/2018 | Ent et al. | |
| 2018/0332205 | A1* | 11/2018 | Hawthorne | G06F 1/1605 |
| 2019/0034147 | A1* | 1/2019 | Koki | G06F 1/1616 |
| 2019/0155562 | A1* | 5/2019 | Lee | G06F 1/1626 |
| 2020/0050416 | A1* | 2/2020 | Myung | G06F 3/04886 |
| 2020/0311354 | A1* | 10/2020 | Furukawa | G06F 3/167 |
| 2021/0165908 | A1 | 6/2021 | Luo et al. | |

FOREIGN PATENT DOCUMENTS

| | | | | |
|---|---|---|---|---|
| CN | 109819106 A | * | 5/2019 | .......... G06F 1/1647 |
| CN | 110140127 A | | 8/2019 | |
| CN | 110308854 A | | 10/2019 | |
| CN | 110456951 A | | 11/2019 | |
| CN | 110795187 A | | 2/2020 | |
| CN | 111443836 A | | 7/2020 | |
| CN | 112416206 A | | 2/2021 | |
| CN | 113573130 A | | 10/2021 | |
| JP | 2015222555 A | | 12/2015 | |
| KR | 101974431 B1 | | 5/2019 | |
| WO | 2019227553 A1 | | 12/2019 | |
| WO | 2020130729 A1 | | 6/2020 | |
| WO | 2020228735 A1 | | 11/2020 | |
| WO | 2021036585 A1 | | 3/2021 | |

\* cited by examiner

MULTI-WINDOW DISPLAY TERMINAL DEVICE AND METHOD

CROSS-REFERENCE TO RELATED APPLICATIONS

This application is a national stage of International Application No. PCT/CN2022/089762, filed on Apr. 28, 2022, which claims priority to Chinese Patent Application No. 202110484712.5, filed on Apr. 30, 2021. The disclosures of both of the aforementioned applications are hereby incorporated by reference in their entireties.

TECHNICAL FIELD

This application relates to the field of terminals, and in particular, to a multi-window display terminal device and method.

BACKGROUND

A plurality of windows may be displayed on a display of a terminal device, so that a user can process different tasks or view different content on the display.

Currently, in the plurality of windows displayed on the display, an area and a position occupied by each window on the display are fixed in advance. If the user wants to adjust a size of the window or move a position of the window, the user needs to drag a control bar of the window or touch a corresponding control, to adjust the size of the window or move the position of the window.

SUMMARY

Embodiments of this application provide a multi-window display terminal device and method, to automatically identify a scenario in which a user is located and automatically adjust a size and/or position of each window in a plurality of windows, so that user experience is improved.

According to a first aspect, an embodiment of this application provides a terminal device. The terminal device includes: a first display, a second display, a first camera, a second camera, and a processor. The first display and the first camera are located in a first area of the terminal device, and the second display and the second camera are located in a second area of the terminal device, where the first area and the second area are located on different sides of the terminal device. The processor is configured to: obtain an instruction of a first user for triggering a plurality of windows on the first display; display a first window and a second window on the first display in response to the instruction of the first user for triggering the plurality of windows; obtain a first image by using the first camera, and obtain a second image by using the second camera, where the first image includes the first user, and the second image includes a second user; and in response to the first image and the second image, display the first window on the first display, and display the second window on the second display, or display the second window on the first display, and display the first window on the second display.

According to the terminal device provided in this embodiment of this application, image information of a user may be collected by using a camera, to determine a display used by the user, and then provide more convenient experience for the user by using a front-rear display technology of the display. With reference to the first aspect, in specific implementations of the first aspect, the first display further displays a third window, and the first display is a foldable screen including a first display area and a second display area, where the first display area and the second display area are determined based on a foldable axis of the first display. The processor is further configured to: obtain a folded state of the first display based on the foldable axis; and display information within the first window and information within the third window in the first display area or the second display area in response to the folded state.

According to the terminal device provided in this embodiment of this application, a position of information within a window may be automatically adjusted by detecting a folded state, so that manual operations are reduced, and user experience is improved.

With reference to the first aspect, in specific implementations of the first aspect, the first display further displays a third window, and the terminal device further includes a microphone. The processor is further configured to: collect a sound of the first user by using the microphone, to determine a language used by the first user; determine, based on the language used by the first user, that the first user corresponds to the first window; and display the reduced first window and the enlarged third window on the first display.

According to the terminal device provided in this embodiment of this application, a voice of a user may be detected by using the microphone to determine a language of the user, and then a window of a translated language is automatically enlarged, so that manual operations are reduced, and user experience is improved.

With reference to the first aspect, in specific implementations of the first aspect, the first image further includes a third user, the first display further displays a third window, and the terminal device further includes a microphone. The processor is further configured to: determine a first distance between the first user and the terminal device and a second distance between the third user and the terminal device based on the first image; collect a sound of the first user and a sound of the third user by using the microphone; determine, based on the sound of the first user and the sound of the third user, a language used by the first user and a language used by the third user; determine, based on the language used by the first user and the language used by the third user, that the first user corresponds to the first window and the third user corresponds to the third window; and when the first distance is greater than the second distance, and a difference between the first distance and the second distance is greater than or equal to a first threshold and less than or equal to a second threshold, display the reduced first window and the enlarged third window on the first display.

According to the terminal device provided in this embodiment of this application, an area corresponding to the first window and an area corresponding to the second window may be automatically adjusted by detecting a distance between a user and the foldable mobile phone, so that manual operations are reduced, and user experience is improved.

With reference to the first aspect, in specific implementations of the first aspect, the first display further displays a third window. The processor is further configured to: detect a first information amount within the first window; detect a second information amount within the third window; and when the first information amount is greater than the second information amount, and a difference between the first information amount and the second information amount is greater than or equal to a third threshold, display the enlarged first window and the reduced third window on the first display; or when the second information amount is greater than the first information amount, and a difference between the second information amount and the first information amount is greater than or equal to a third threshold, display the reduced first window and the enlarged third window on the first display.

According to the terminal device provided in this embodiment of this application, a size of a window may be automatically adjusted by detecting an information amount within the window, so that manual operations are reduced, and user experience is improved.

With reference to the first aspect, in specific implementations of the first aspect, a sum of a size of the reduced first window and a size of the enlarged third window is equal to a sum of a size of the first window and a size of the third window.

With reference to the first aspect, in specific implementations of the first aspect, the size of the reduced first window is one-third of a size of the first display, and the size of the enlarged third window is two-thirds of the size of the first display; or the size of the reduced first window is two-fifths of a size of the first display, and the size of the enlarged third window is three-fifths of the size of the first display.

With reference to the first aspect, in specific implementations of the first aspect, the first camera and/or the second camera are/is (a) low power consumption camera(s); and the first image includes profile information of the first user, and the second image includes profile information of the second user.

According to a second aspect, an embodiment of this application provides another terminal device, including an obtaining module and a processing module. The obtaining module is configured to: obtain an instruction of a first user for triggering a plurality of windows on a first display. The processing module is configured to: display a first window and a second window on the first display in response to the instruction of the first user for triggering the plurality of windows; obtain a first image by using a first camera, and obtain a second image by using a second camera, where the first image includes the first user, and the second image includes a second user; and in response to the first image and the second image, display the first window on the first display, and display the second window on a second display, or display the second window on the first display, and display the first window on a second display.

With reference to the second aspect, in specific implementations of the second aspect, the first display further displays a third window, and the first display is a foldable screen including a first display area and a second display area, where the first display area and the second display area are determined based on a foldable axis of the first display. The obtaining module is further configured to: obtain a folded state of the first display based on the foldable axis; and the processing module is further configured to display information within the first window and information within the third window in the first display area or the second display area in response to the folded state.

With reference to the second aspect, in specific implementations of the second aspect, the first display further displays a third window, and the terminal device further includes a microphone. The processing module is further configured to: collect a sound of the first user by using the microphone, to determine a language used by the first user; determine, based on the language used by the first user, that the first user corresponds to the first window; and display the reduced first window and the enlarged third window on the first display.

With reference to the second aspect, in specific implementations of the second aspect, the first image further includes a third user, the first display further displays a third window, and the terminal device further includes a microphone. The processing module is further configured to: determine a first distance between the first user and the terminal device and a second distance between the third user and the terminal device based on the first image; collect a sound of the first user and a sound of the third user by using the microphone; determine, based on the sound of the first user and the sound of the third user, a language used by the first user and a language used by the third user; determine, based on the language used by the first user and the language used by the third user, that the first user corresponds to the first window and the third user corresponds to the third window; and when the first distance is greater than the second distance, and a difference between the first distance and the second distance is greater than or equal to a first threshold and less than or equal to a second threshold, display the reduced first window and the enlarged third window on the first display.

With reference to the second aspect, in specific implementations of the second aspect, the first display further displays a third window. The processing module is further configured to: detect a first information amount within the first window; detect a second information amount within the third window; and when the first information amount is greater than the second information amount, and a difference between the first information amount and the second information amount is greater than or equal to a third threshold, display the enlarged first window and the reduced third window on the first display; or when the second information amount is greater than the first information amount, and a difference between the second information amount and the first information amount is greater than or equal to a third threshold, display the reduced first window and the enlarged third window on the first display.

With reference to the second aspect, in specific implementations of the second aspect, a sum of a size of the reduced first window and a size of the enlarged third window is equal to a sum of a size of the first window and a size of the third window.

With reference to the second aspect, in specific implementations of the second aspect, the size of the reduced first window is one-third of a size of the first display, and the size of the enlarged third window is two-thirds of the size of the first display; or the size of the reduced first window is two-fifths of a size of the first display, and the size of the enlarged third window is three-fifths of the size of the first display.

With reference to the second aspect, in specific implementations of the second aspect, the first camera and/or the second camera are/is (a) low power consumption camera(s); and the first image includes profile information of the first user, and the second image includes profile information of the second user.

According to a third aspect, an embodiment of this application provides a multi-window display method, applied to a terminal device including a first display, a second display, a first camera, and a second camera. The first display and the first camera are located in a first area of the terminal device, and the second display and the second camera are located in a second area of the terminal device, where the first area and the second area are located on different sides of the terminal device. The method includes: obtaining an instruction of a first user for triggering a plurality of windows on the first display; displaying a first window and a second window on the first display in response to the instruction of the first user for triggering the plurality of windows; obtaining a first image by using the first camera, and obtaining a second image by using the second camera, where the first image includes the first user, and the second image includes a second user; and in response to the first image and the second image, displaying the first window on the first display, and displaying the second window on the second display, or displaying the second window on the first display, and displaying the first window on the second display.

According to the multi-window display method provided in this embodiment of this application, image information of a user may be collected by using a camera, to determine a display used by the user, and then provide more convenient experience for the user by using a front-rear display technology of the display.

With reference to the third aspect, in specific implementations of the third aspect, the first display further displays a third window, and the first display is a foldable screen including a first display area and a second display area, where the first display area and the second display area are determined based on a foldable axis of the first display. The method further includes: obtaining a folded state of the first display based on the foldable axis; and displaying information within the first window and information within the third window in the first display area or the second display area in response to the folded state.

According to the multi-window display method provided in this embodiment of this application, a position of information within a window may be automatically adjusted by detecting a folded state, so that manual operations are reduced, and user experience is improved.

With reference to the third aspect, in specific implementations of the third aspect, the first display further displays a third window, and the terminal device further includes a microphone. The method further includes: collecting a sound of the first user by using the microphone, to determine a language used by the first user; determining, based on the language used by the first user, that the first user corresponds to the first window; and displaying the reduced first window and the enlarged third window on the first display.

According to the multi-window display method provided in this embodiment of this application, a voice of a user may be detected by using the microphone to determine a language of the user, and then a window of a translated language is automatically enlarged, so that manual operations are reduced, and user experience is improved.

With reference to the third aspect, in specific implementations of the third aspect, the first image further includes a third user, the first display further displays a third window, and the terminal device further includes a microphone. The method further includes: determining a first distance between the first user and the terminal device and a second distance between the third user and the terminal device based on the first image; collecting a sound of the first user and a sound of the third user by using the microphone; determining, based on the sound of the first user and the sound of the third user, a language used by the first user and a language used by the third user; determining, based on the language used by the first user and the language used by the third user, that the first user corresponds to the first window and the third user corresponds to the third window; and when the first distance is greater than the second distance, and a difference between the first distance and the second distance is greater than or equal to a first threshold and less than or equal to a second threshold, displaying the reduced first window and the enlarged third window on the first display.

According to the multi-window display method provided in this embodiment of this application, an area corresponding to the first window and an area corresponding to the second window may be automatically adjusted by detecting a distance between a user and the foldable mobile phone, so that manual operations are reduced, and user experience is improved.

With reference to the third aspect, in specific implementations of the third aspect, the first display further displays a third window. The method further includes: detecting a first information amount within the first window; detecting a second information amount within the third window; and when the first information amount is greater than the second information amount, and a difference between the first information amount and the second information amount is greater than or equal to a third threshold, displaying the enlarged first window and the reduced third window on the first display; or when the second information amount is greater than the first information amount, and a difference between the second information amount and the first information amount is greater than or equal to a third threshold, displaying the reduced first window and the enlarged third window on the first display.

According to the multi-window display method provided in this embodiment of this application, a size of a window may be automatically adjusted by detecting an information amount within the window, so that manual operations are reduced, and user experience is improved.

With reference to the third aspect, in specific implementations of the third aspect, a sum of a size of the reduced first window and a size of the enlarged third window is equal to a sum of a size of the first window and a size of the third window.

With reference to the third aspect, in specific implementations of the third aspect, the size of the reduced first window is one-third of a size of the first display, and the size of the enlarged third window is two-thirds of the size of the first display; or the size of the reduced first window is two-fifths of a size of the first display, and the size of the enlarged third window is three-fifths of the size of the first display.

With reference to the third aspect, in specific implementations of the third aspect, the first camera and/or the second camera are/is (a) low power consumption camera(s); and the first image includes profile information of the first user, and the second image includes profile information of the second user.

According to a fourth aspect, an embodiment of this application provides a processor, including: an input circuit, an output circuit, and a processing circuit. The processing circuit is configured to receive a signal by using the input circuit and transmit a signal by using the output circuit, so that the processor is enabled to perform the method according to any one of the possible implementations of the first aspect.

In a specific implementation process, the processor may be a chip, the input circuit may be an input pin, the output circuit may be an output pin, and the processing circuit may be a transistor, a gate circuit, a flip-flop, various logic circuits, and the like. The input signal received by the input circuit may be received and input by, for example, but not limited to, a receiver. The signal output by the output circuit may be output to and transmitted by, for example, but not limited to, a transmitter. The input circuit and output circuit may be a same circuit that serves as an input circuit and an output circuit respectively at different moments. Specific implementations of the processor and various circuits are not limited in this embodiment of this application.

According to a fifth aspect, an embodiment of this application provides a processing apparatus, including a processor and a memory. The processor is configured to read instructions stored in the memory, and can receive a signal by using a receiver and transmit a signal by using a transmitter, to perform the method according to any one of the possible implementations of the first aspect.

Optionally, there is one or more processors, and there is one or more memories.

Optionally, the memory may be integrated in the processor, or the memory and the processor are separately disposed.

In a specific implementation process, the memory may be a non-transitory (non-transitory) memory such as a read only memory (read only memory, ROM). The memory and the processor may be integrated on a same chip, or may be arranged on different chips respectively. A type of the memory and an arrangement manner of the memory and the processor are not limited in embodiments of this application.

It should be understood that a related data exchange process, for example, sending indication information, may be a process of outputting indication information from the processor, and receiving capability information may be a process of receiving input capability information by the processor. Specifically, data output by the processor may be output to the transmitter, and input data received by the processor may be from the receiver. The transmitter and the receiver may be collectively referred to as a transceiver.

The processing apparatus in the fifth aspect may be a chip, and the processor may be implemented by hardware or software. When implemented by hardware, the processor may be a logic circuit, an integrated circuit, or the like; or when implemented by software, the processor may be a general-purpose processor, and is implemented by reading software code stored in a memory. The memory may be integrated in the processor, or located outside the processor and exist separately.

According to a sixth aspect, an embodiment of this application provides a computer-readable storage medium. The computer-readable storage medium stores a computer program (which may also be referred to as code or instructions). When the computer program is run on a computer, the computer is enabled to perform the method according to any one of the possible implementations of the first aspect.

According to a seventh aspect, an embodiment of this application provides a computer program product. The computer program product includes a computer program (which may also be referred to as code or instructions). When the computer program is run, the computer is enabled to perform the method according to any one of the possible implementations of the first aspect.

DETAILED DESCRIPTION OF ILLUSTRATIVE EMBODIMENTS

The following describes technical solutions in this application with reference to the accompanying drawings.

A terminal device in embodiments of this application may be referred to as a terminal (terminal), user equipment (user equipment, UE), a mobile station (mobile station, MS), a mobile terminal (mobile terminal, MT), or the like. The terminal device may be a mobile phone (mobile phone), a smart television, a wearable device, a tablet computer (Pad), a computer having a wireless transmission and receiving function, a virtual reality (virtual reality, VR) terminal device, an augmented reality (augmented reality, AR) terminal device, a wireless terminal related to industrial control (industrial control), a wireless terminal related to self-driving (self-driving), a wireless terminal related to remote medical surgery (remote medical surgery), a wireless terminal related to a smart grid (smart grid), a wireless terminal related to transportation safety (transportation safety), a wireless terminal related to a smart city (smart city), a wireless terminal related to a smart home (smart home), or the like. Embodiments of this application impose no limitation on a specific technology and a specific device form used by the terminal device.

Currently, in a plurality of windows displayed on the display, an area and a position occupied by each window on the display are fixed in advance. If a user wants to adjust a size of the window or move a position of the window, the user needs to drag a control bar of the window or touch a corresponding control, to manually adjust the size and/or position of the window, which requires complex operations and poor user experience.

An example in which the terminal device is a mobile phone is described below. The example does not constitute a limitation on embodiments of this application.

Generally, a display of the mobile phone can display a window in two manners: landscape display and portrait display. In a case in which a direction locking function of the terminal device is disabled, when the user holds the mobile phone horizontally, the window in a phone interface is in a landscape display state; or when the user holds the mobile phone vertically, the window in a phone interface is in a portrait display state. For example, the mobile phone may detect a current holding direction of the mobile phone by using a sensor such as a gyroscope. For example, when a deflection angle of the gyroscope exceeds a specific threshold, landscape display or portrait display on the interface is triggered.

Figure 1:
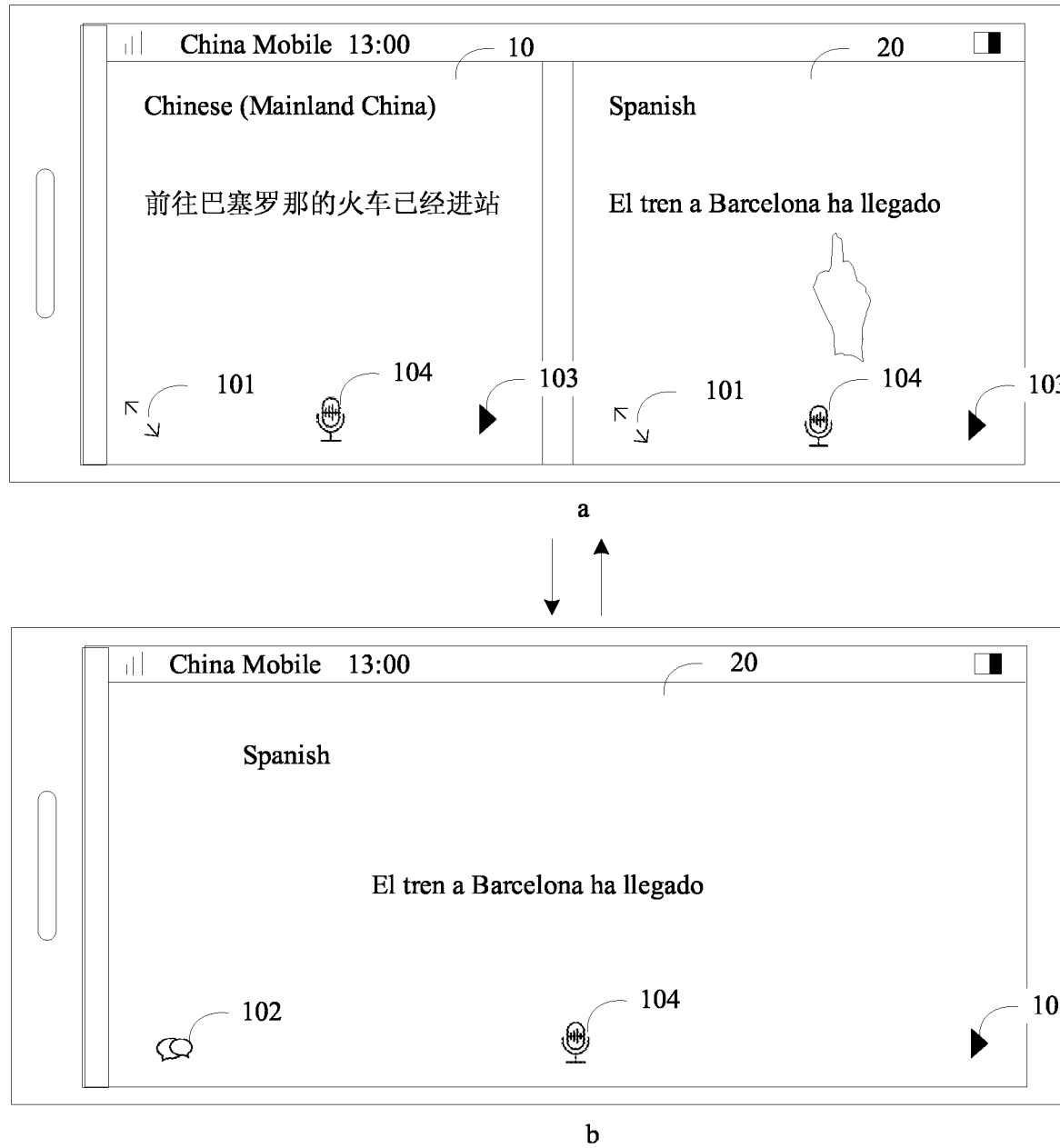
FIG. 1 is a schematic diagram of an interface of multi-window landscape display.

FIG. 1 is a schematic diagram of an interface of multi-window landscape display. After the mobile phone obtains an instruction of the user for opening translation software on the display and requesting to translate Chinese "前往巴塞 □ □ □ □ □ □ □ □" into Spanish, an interface a in FIG. 1 may be displayed. As shown in the interface a in FIG. 1, the display of the mobile phone presents a window 10 and a window 20. The window 10 is used to display Chinese "前往巴塞 □ □ □ □ □ □ □ □", and is located in a left part of the display. The window 20 is used to display Spanish "El tren a Barcelona ha llegado"; and is located in a right part of the display.

In addition, the interface a may include a full-screen icon 101, a pronunciation icon 103, a microphone icon 104, and the like. The full-screen icon 101 is used to set the window 10 or the window 20 as full-screen display, the pronunciation icon 103 is used to read Spanish or Chinese translation for the user, and the microphone icon 104 is used to obtain a voice sent by the user. The user may tap the microphone icon 104 to trigger a microphone control. When detecting that the microphone control 104 is triggered, the mobile phone may collect the sound of the user "前往巴塞 □ □ □ □ □ □ □ □" by using the microphone and identify the sound of the user as a to-be-translated language to be displayed in the window 10. The user may also tap the pronunciation icon 103 to trigger a pronunciation control. When detecting that the pronunciation control is triggered, the mobile phone may output the Spanish "El tren a Barcelona ha llegado" within the window 20 to the user by using a speaker.

Assuming that the user wants the window 20 to be displayed in full screen, the user may first use a hand to tap any area of the window 20, to select the window 20, and then tap the full-screen icon 101 to trigger a full-screen control. After detecting that the full screen control is triggered, the mobile phone displays the window 20 in full screen, that is, displays an interface b shown in FIG. 1.

In the interface b shown in FIG. 1, in addition to the pronunciation icon 103 and the microphone icon 104, a multi-window icon 102 is further displayed. The multi-window icon 102 is used to return to a multi-window display state shown in the interface a. If the user wants to return to the multi-window state, the user may tap the multi-window icon 102 to trigger a multi-window control. When detecting that the multi-window control is triggered, the mobile phone displays the interface a shown in FIG. 1.

Figure 2:
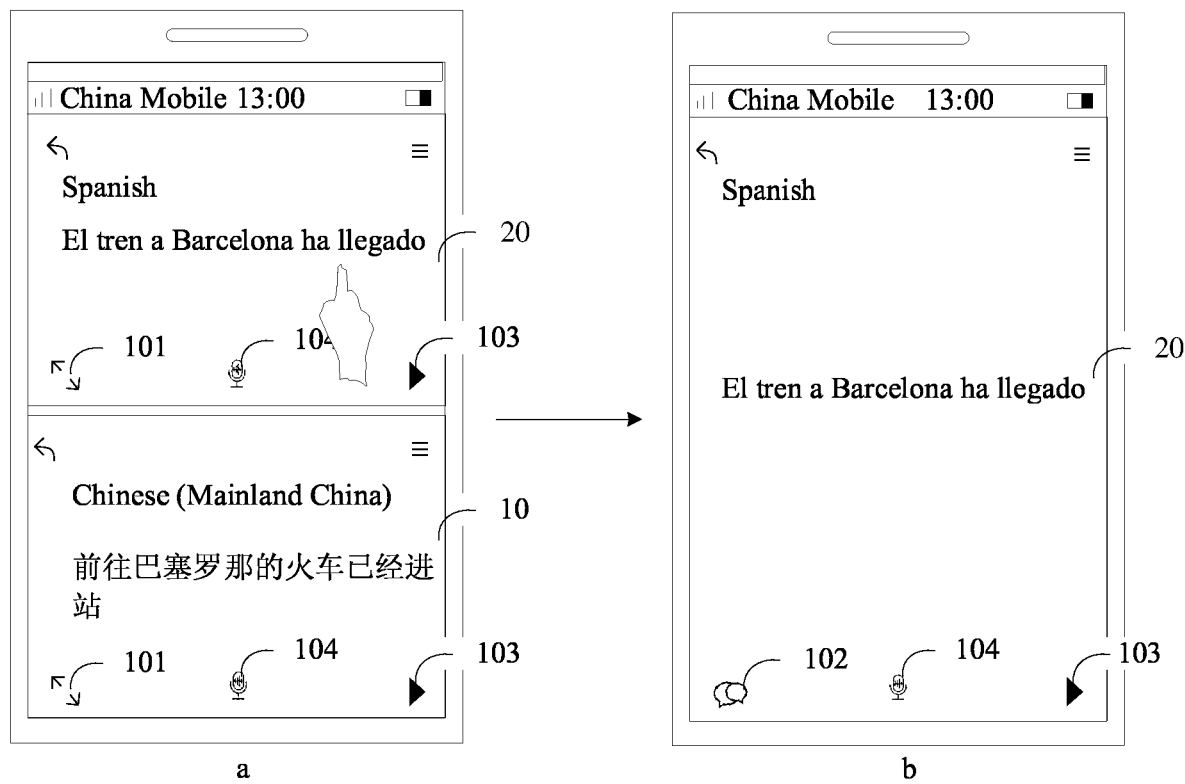
FIG. 2 is a schematic diagram of an interface of multi-window portrait display.

FIG. 2 is a schematic diagram of an interface of multi-window portrait display. As shown in an interface a in FIG. 2, a window 20 is located in an upper part of the display of the mobile phone, and a window 10 is located in a lower part of the display of the mobile phone. Specific display content of the window 10 and the window 20 is the same as that in FIG. 1. Details are not described herein again.

Assuming that the user wants the window 20 to be displayed in full screen, the user may first use a hand to tap any area of the window 20, to select the window 20, and then tap the full-screen icon 101 to trigger a full screen control. After detecting that the full screen control is triggered, the mobile phone displays the window 20 in full screen, that is, displays an interface b shown in FIG. 2. In the interface b shown in FIG. 2, if the user wants to return to the multi-window state, the user may tap the multi-window icon 102 to trigger a multi-window control. When detecting that the multi-window control is triggered, the mobile phone displays the interface a shown in FIG. 2.

In FIG. 1 and FIG. 2, the user needs to know an operation procedure of changing a position and size of the window, and manually triggers a control to change the position and size of the window, which requires complex operations and is unfavorable to the user experience.

In view of this, embodiments of this application provide a multi-window display terminal device and method, to automatically identify a scenario corresponding to the user, and automatically adjust a size or position of each window in a plurality of windows based on different scenarios, so that user experience is improved.

Figure 3:
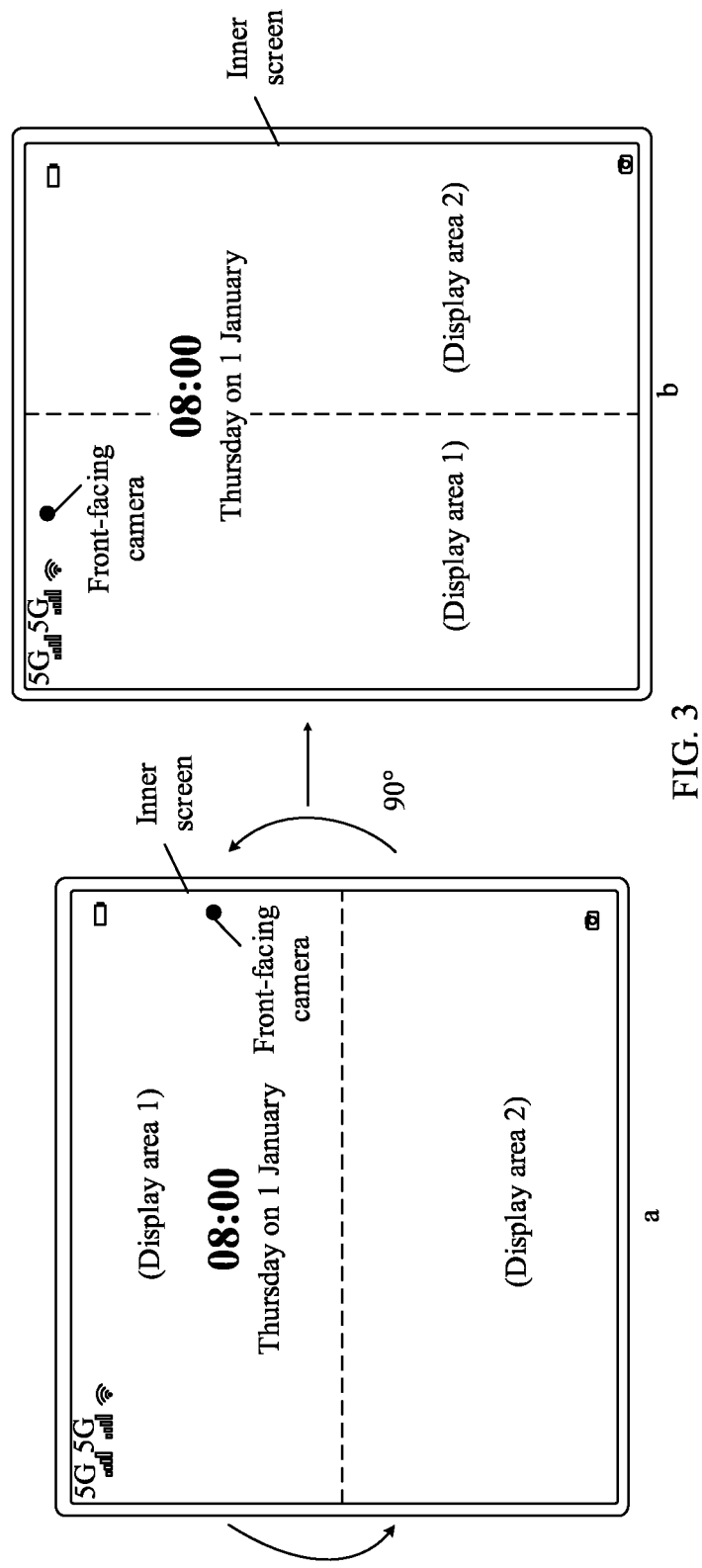
FIG. 3 is a schematic diagram of an inner screen interface of a foldable mobile phone according to an embodiment of this application.
Figure 4:
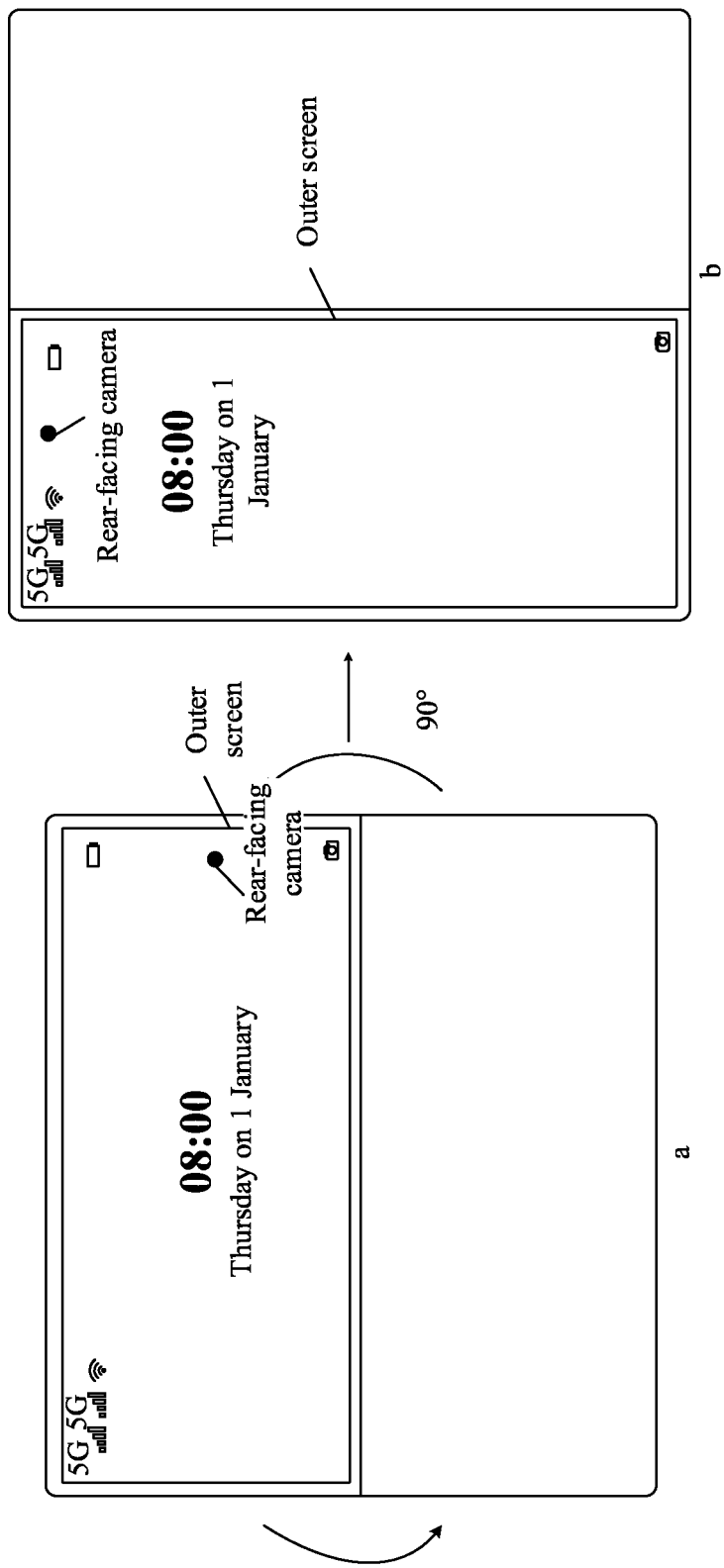
FIG. 4 is a schematic diagram of an outer screen interface of a foldable mobile phone according to an embodiment of this application.

The multi-window display method provided in embodiments of this application may be applied to a terminal device having a foldable screen, for example, a foldable mobile phone. The foldable mobile phone has two displays: an inner screen and an outer screen. FIG. 3 is a schematic diagram of an inner screen of a foldable mobile phone according to an embodiment of this application. As shown in an interface a in FIG. 3, the inner screen of the foldable mobile phone is in a landscape display state. The user may rotate the foldable mobile phone by 90°, and therefore the foldable mobile phone is in a portrait display state, which is shown in an interface b in FIG. 3. A dashed line in the inner screen may represent a foldable axis of the foldable screen. The inner screen may be divided into a display area 1 and a display area 2 based on the foldable axis. FIG. 4 is a schematic diagram of an outer screen of a foldable mobile phone according to an embodiment of this application. As shown in an interface a in FIG. 4, the outer screen of the foldable mobile phone is in a landscape display state. The user may rotate the foldable mobile phone by 90°, to enable the foldable mobile phone to be displayed vertically, which is shown in an interface b in FIG. 4. It should be understood that the foldable mobile phone can be folded by using the foldable axis, and after the foldable mobile phone is totally folded, the user can see only the outer screen of the foldable mobile phone.

In addition, the foldable mobile phone includes a front-facing camera and a rear-facing camera. The front-facing camera and the inner screen are located on an inner side of the foldable mobile phone, and the rear-facing camera and the outer screen are located on an outer side of the foldable mobile phone. It should be understood that positions and a quantity of the cameras shown in FIG. 3 and FIG. 4 are merely an example. It should be further understood that the front-facing camera may also be referred to as an inner side camera, and the rear-facing camera may also be referred to as an outer side camera.

Optionally, the front-facing camera and/or the rear-facing camera may be (a) low power consumption camera(s), and may collect profile information of the user. It should be understood that use of the low power consumption camera for the foldable mobile phone can reduce power consumption of the foldable mobile phone, and increase standby time of the foldable mobile phone.

The multi-window display method provided in embodiments of this application may be alternatively applied to a terminal device having a first display and a second display, for example, a bar-type mobile phone. Both the first display and the second display are non-foldable displays. The first display may be located on a front side of the terminal device, and the second display may be located on a rear side of the terminal device. It should be understood that the front side may be understood as a side of the terminal device that is often used by the user, and the rear side may be understood as a side of the terminal device that is not often used by the user.

Optionally, the terminal device may further include a front-facing camera and a rear-facing camera. The front-facing camera and the first display may be located on a front side of the terminal device, and the rear-facing camera and the outer screen may be located on a rear side of the terminal device. To make the objectives and technical solutions of this application more clearly and intuitively, the following describes in detail the method and the apparatus provided in embodiments of this application with reference to the accompanying drawings and embodiments. It should be understood that specific embodiments described herein are merely used to explain this application, but are not intended to limit this application.

Figure 5:
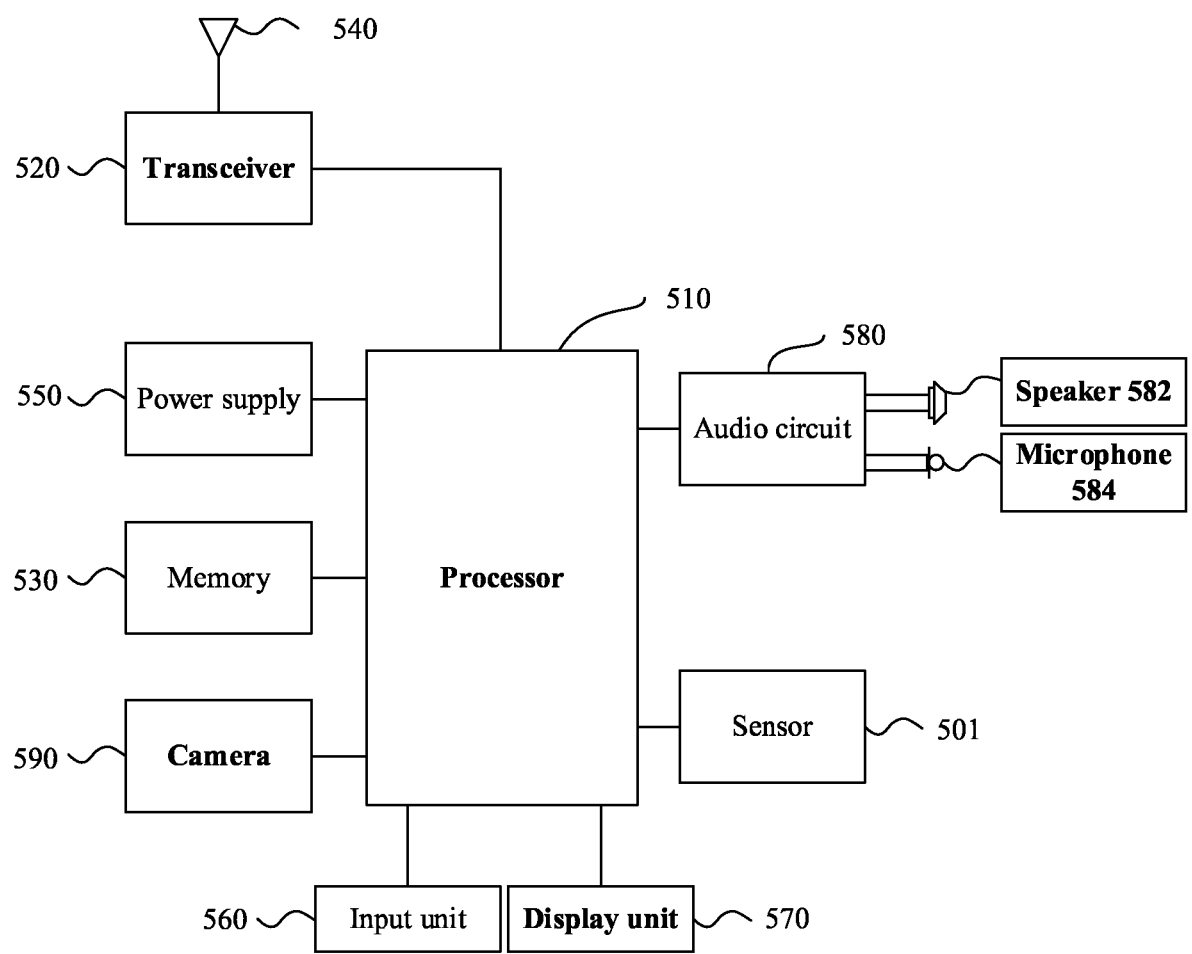
FIG. 5 is a schematic diagram of a system architecture of a terminal device according to an embodiment of this application.

For example, the foregoing related system architecture having the foldable mobile phone and the bar-type mobile phone may be shown in FIG. 5. The terminal device may include a processor 510, a transceiver 520, and a display unit 570. The display unit 570 may include a foldable display or a non-foldable display.

Optionally, the terminal device may further include a memory 530. The processor 510, the transceiver 520, and the memory 530 may communicate with each other by using an internal connection path to transmit control and/or data signals. The memory 530 is configured to store a computer program. The processor 510 is configured to invoke the computer program from the memory 530 and run the computer program.

Optionally, the terminal device may further include an antenna 540, configured to send a radio signal output by the transceiver 520.

The processor 550 and the memory 530 may be combined into a processing apparatus, and more commonly, may be independent components. The processor 550 is configured to execute program code stored in the memory 530 to implement the foregoing functions. During specific implementation, the memory 530 may be integrated into the processor 550, or is independent from the processor 550.

In addition, to achieve more comprehensive functions for the terminal device, the terminal device may further include one or more of an input unit 560, an audio circuit 580, a camera 590, a sensor 505, and the like. The audio circuit may further include a speaker 582, a microphone 584, and the like.

Optionally, the terminal device may further include a power supply 550, configured to supply power for various components or circuits in the terminal device.

It may be understood that operations and/or functions of various modules in the terminal device shown in FIG. 5 are intended to respectively implement corresponding procedures in the method embodiment below. For details, refer to descriptions in the method embodiment below. To avoid repetition, detailed descriptions are omitted herein as appropriate.

It may be understood that the processor 510 in the terminal device shown in FIG. 5 may include one or more processing units. For example, the processor 510 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent devices, or may be integrated into one or more processors.

A memory may be further disposed in the processor 510, and is configured to store instructions and data. In some embodiments, the memory in the processor 510 is a cache. The memory may store instructions or data just used or cyclically used by the processor 510. If the processor 510 needs to use the instructions or the data again, the processor 510 may directly invoke the instructions or the data from the memory. Repeated access is avoided, and a waiting time of the processor 510 is reduced, thereby improving system efficiency.

In some embodiments, the processor 510 may include one or more interfaces. The interface may include an inter-integrated circuit (Inter-integrated Circuit, I2C) interface, an inter-integrated circuit sound (Inter-integrated Circuit Sound, I2S) interface, a pulse code modulation (Pulse Code Modulation, PCM) interface, and a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) port, and/or the like.

The I2C interface is a bidirectional synchronous serial bus, including a serial data line (serial data line, SDA) and a serial clock line (derail clock line, SCL). In some embodiments, the processor 510 may include a plurality of groups of I2C buses. The processor 510 may be coupled to the touch sensor 180K, a charger, a flash, the camera 590 and the like by using different I2C bus interfaces. For example, the processor 510 may be coupled to the touch sensor 180K by using the I2C interface, so that the processor 510 communicates with the touch sensor 180K by using the I2C bus interface, to implement a touch function of the terminal device.

The I2S interface may be used for audio communication. In some embodiments, the processor 510 may include a plurality of I2S buses. The processor 510 may be coupled to the audio circuit 580 by using an I2S bus to implement communication between the processor 510 and the audio circuit 580. In some embodiments, the audio circuit 580 may transmit an audio signal to the transceiver 520 by using the I2S interface, to implement a function of answering voice calls by using a Bluetooth earphone.

The PCM interface may also be used for audio communication to sample, quantize, and encode an analog signal. In some embodiments, the audio circuit 580 and the transceiver 520 may be coupled by using a PCM bus interface. In some embodiments, the audio circuit 580 may alternatively transmit an audio signal to the transceiver 120 by using the PCM interface, to implement a function of answering voice calls by using the Bluetooth earphone. Both the I2S interface and the PCM interface may be used for audio communication.

The UART interface is a universal serial data bus used for asynchronous communication. The bus may be a bidirectional communication bus. The bus converts to-be-transmitted data between serial communication and parallel communication. In some embodiments, the UART interface is usually used to connect the processor 510 to the transceiver 520. For example, the processor 510 communicates with a Bluetooth module in the transceiver 520 by using the UART interface, to implement a Bluetooth function. In some embodiments, an audio circuit 580 may transmit an audio signal to the transceiver 520 by using the UART interface, to implement a function of playing music by using a Bluetooth earphone.

The MIPI interface may be used to connect the processor 510 to the display unit 570, the camera 590, and another peripheral device. The MIPI interface includes a camera serial interface (camera serial interface, CSI), a display serial interface (display serial interface, DSI), and the like. In some embodiments, the processor 550 communicates with the camera 590 by using the CSI interface, to implement a photographing function of the terminal device. The processor 550 communicates with the display unit 570 by using the DSI interface, to implement a display function of the terminal device.

The GPIO interface can be configured by using software. The GPIO interface may be configured as a control signal, or may be configured as a data signal. In some embodiments, the GPIO interface may be used to connect the processor 550 to the camera 590, the display unit 570, the transceiver 520, the audio circuit 580, the sensor 505, and the like. The GPIO interface may alternatively be configured as an I2C interface, an I2S interface, a UART interface, an MIPI interface, or the like.

It may be understood that the interface connection relationship between the modules illustrated in embodiments of this application is only an example description and does not constitute a structural limitation on the terminal device. In some other embodiments of this application, the terminal device may alternatively use an interface connection manner different from that in the foregoing embodiment, or use a combination of a plurality of interface connection manners.

It may be understood that the power supply 550 shown in FIG. 5 is configured to supply power to the processor 550, the memory 530, the display unit 570, the camera 590, the input unit 560, the transceiver 520, and the like.

The antenna 540 is configured to transmit and receive an electromagnetic wave signal. Each antenna in the terminal device may be configured to cover one or more communication frequency bands. Different antennas may further be multiplexed to improve utilization of the antennas. For example, the antenna 540 may be multiplexed into a diversity antenna of a wireless local area network. In some other embodiments, the antenna may be used in combination with a tuning switch.

The transceiver 520 may provide a solution, applied to the terminal device, to wireless communication including a wireless local area network (wireless local area network, WLAN) (such as a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, and the like. The transceiver 520 may be one or more components integrating at least one communication processing module. The transceiver 520 receives an electromagnetic wave by using the antenna 540, performs frequency modulation and filtering processing on the electromagnetic wave signal, and sends a processed signal to the processor 550. The transceiver 520 may also receive a to-be-transmitted signal from the processor 550, perform frequency modulation and amplification on the signal, and convert the signal into an electromagnetic wave for radiation by using the antenna 540.

In some embodiments, the antenna 540 in the terminal device is coupled to the transceiver 520, so that the terminal device can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a Beidou navigation satellite system (Beidou navigation satellite system, BDS), a quasi-zenith satellite system (quasi-zenith satellite system, QZSS), and/or a satellite based augmentation system (satellite based augmentation systems, SBAS).

The terminal device implements a display function by using the GPU, the display unit 570, the application processor, and the like. The GPU is a microprocessor for image processing, and is connected to the display unit 570 and the application processor. The GPU is configured to perform mathematical and geometric calculations to render graphics. The processor 550 may include one or more GPUs that execute a program instruction to generate or change display information.

The display unit 570 is configured to display an image, a video, and the like. The display unit 570 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flex light-emitting diode (flex light-emitting diode, FLED), a mini-LED, a micro-LED, a micro-OLED, a quantum dot light emitting diode (quantum dot light emitting diodes, QLED), or the like. In some embodiments, the terminal device may include one or N display units 170, where N is a positive integer greater than 1.

The terminal device may implement a photographing function by using the ISP, the camera 590, the video codec, the GPU, the display unit 570, the application processor, and the like.

The ISP is configured to process data fed back by the camera 590. For example, during video recording, a camera is turned on, and light is transmitted to a photosensitive element of the camera by using a lens. An optical signal is converted into an electrical signal, and the photosensitive element of the camera transmits the electrical signal to the ISP for processing, to convert the electrical signal into a visible image. The ISP can further optimize algorithms for noise, brightness, and a skin color of the image. The ISP can further optimize parameters such as exposure and a color temperature in a photographing scenario. In some embodiments, the ISP may be disposed in the camera 590.

The camera 590 is configured to capture a static image or a video. An optical image of an object is generated by using the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the terminal device may include one or N cameras 590, where N is a positive integer greater than 1.

The digital signal processor is configured to process a digital signal, and may process another digital signal in addition to the digital image signal. For example, when the terminal device selects a frequency, the digital signal processor is configured to perform Fourier transform and the like on frequency energy.

The video codec is configured to compress or decompress a digital video. The terminal device may support one or more types of video codecs. In this way, the terminal device may play back or record videos in a plurality of coding formats, for example, moving picture experts group (moving picture experts group, MPEG)1, MPEG2, MPEG3, and MPEG4.

The NPU is a neural-network (neural-network, NN) computing processor, quickly processes input information by referring to a structure of a biological neural network, for example, by referring to a mode of transfer between neurons in human brain, and may further perform self-learning continuously. Applications such as intelligent cognition of the terminal device, such as image recognition, facial recognition, speech recognition, and text understanding, may be implemented by using the NPU.

The memory 530 may be configured to store computer-executable program code, where the executable program code includes instructions. The memory 530 may include a program storage area and a data storage area. The program storage area may store an operating system, an application required by at least one function (for example, a sound play function or an image play function), or the like. The data storage area may store data (such as audio data and an address book) created during use of the terminal device, and the like. In addition, the memory 530 may include a high-speed random access memory, or may include a non-volatile memory, for example, at least one magnetic disk storage device, a flash memory device, or a universal flash storage (universal flash storage, UFS). The processor 550 runs instructions stored in the memory 530 and/or instructions stored in the memory disposed in the processor, to perform various function applications and data processing of the terminal device.

The terminal device may implement an audio function, for example, music playing and recording, by using the audio circuit 580, the speaker 582, the microphone 584, the application processor, and the like.

The audio circuit 580 is configured to convert digital audio information into an analog audio signal for output, and is also configured to convert an analog audio input into a digital audio signal. The audio circuit 580 may be further configured to encode and decode an audio signal. In some embodiments, the audio circuit 580 may be disposed in the processor 510, or some functional modules of the audio circuit 580 may be disposed in the processor 510.

The speaker 582, also referred to as a "loudspeaker", is configured to convert an audio electrical signal into a sound signal. The terminal device may be used to listen to music or answer a call in a hands-free mode by using the speaker 582.

The microphone 584, also referred to as a "mic" or "mike", is configured to convert a sound signal into an electrical signal. When making a call or sending a voice message, a user may input a sound signal into the microphone 584 by speaking close to the microphone 584. At least one microphone 584 may be disposed in the terminal device. In some other embodiments, two microphones 584 may be disposed in the terminal device, to collect a sound signal and implement a noise reduction function. In some other embodiments, the terminal device may alternatively be provided with three, four, or more microphones 584 to collect sound signals, reduce noise, identify a sound source, implement directional recording, and the like.

The foregoing describes the multi-window display terminal device provided in embodiments of this application with reference to FIG. 3 to FIG. 5. The following describes a multi-window display method provided in embodiments of this application in detail with reference to FIG. 6A-FIG. 6C to FIG. 15A-FIG. 15B.

The multi-window display method provided in embodiments of this application may be applied to services, such as translation software and video call, that is suitable for multi-window.

The following describes the multi-window display method of this application in detail in a plurality of different embodiments by using an example in which translation software presents two windows.

It should be understood that the window in the translation software means an area for displaying language content. For example, the user uses translation software for Chinese-English translation. The mobile phone may display an area for displaying Chinese and an area for displaying English, and the area for displaying Chinese may be one window and the area for displaying English may be the other window.

Embodiment 1

Figure 6A:
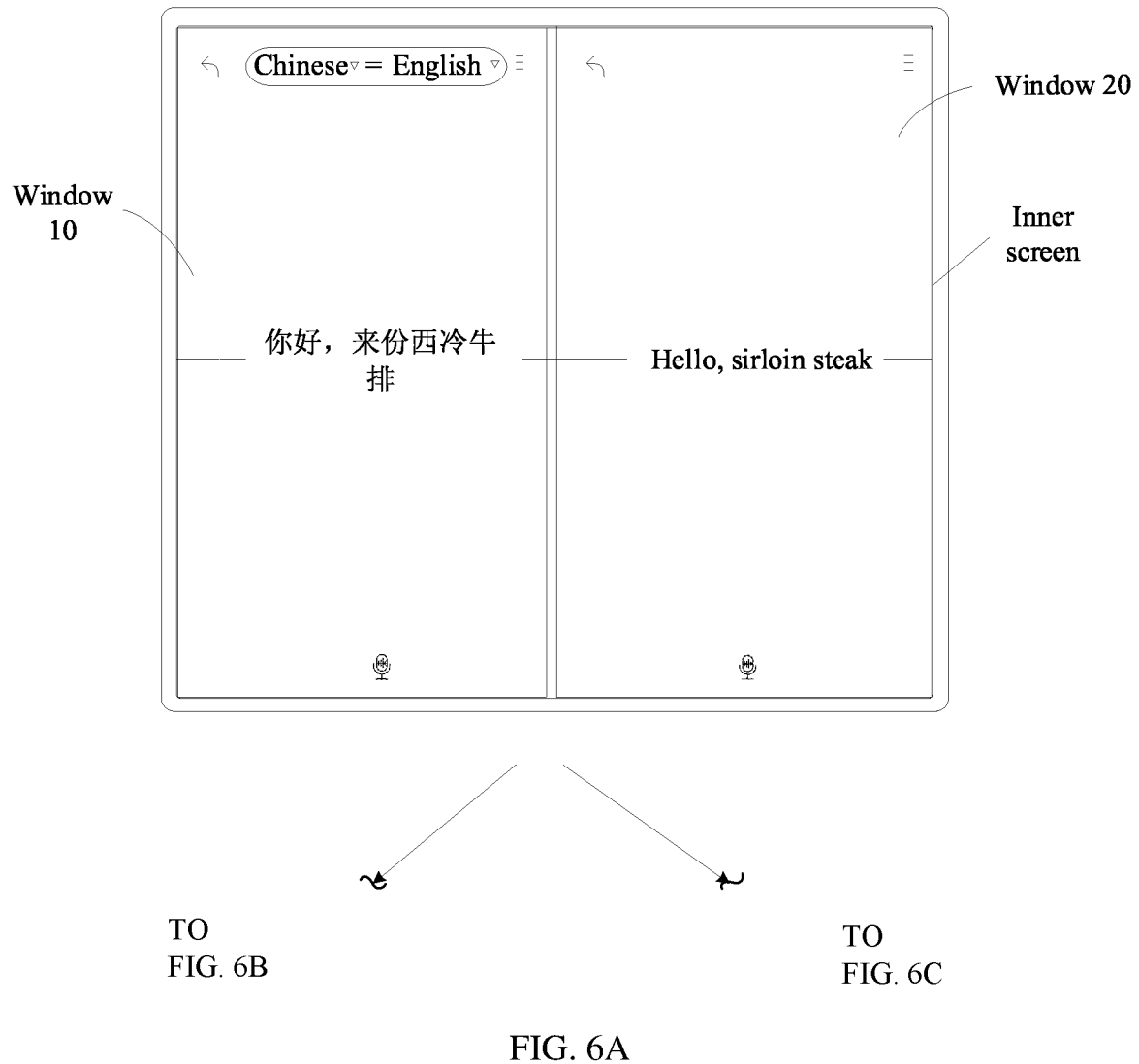
FIG. 6A-FIG. 6C are a schematic diagram of an interface of multi-window landscape display according to an embodiment of this application.
Figure 6B:
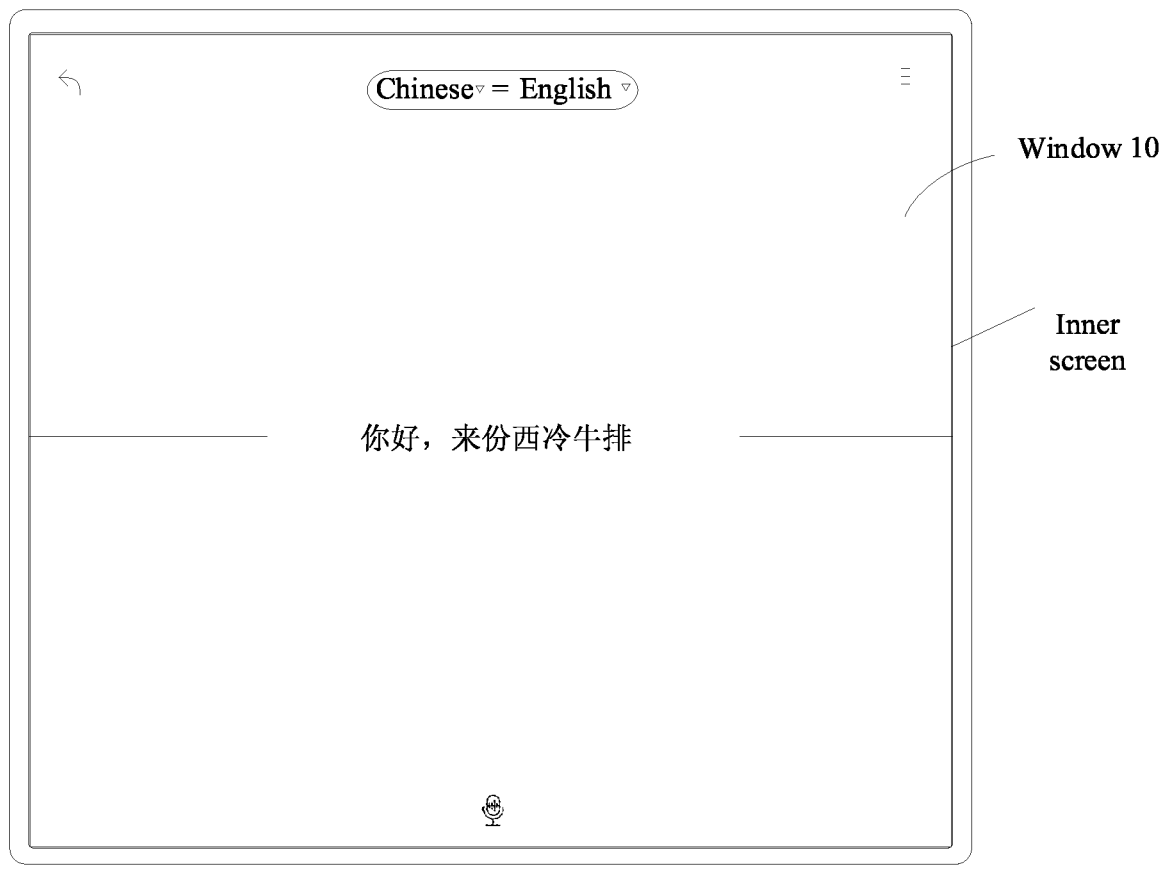
Figure 6C:
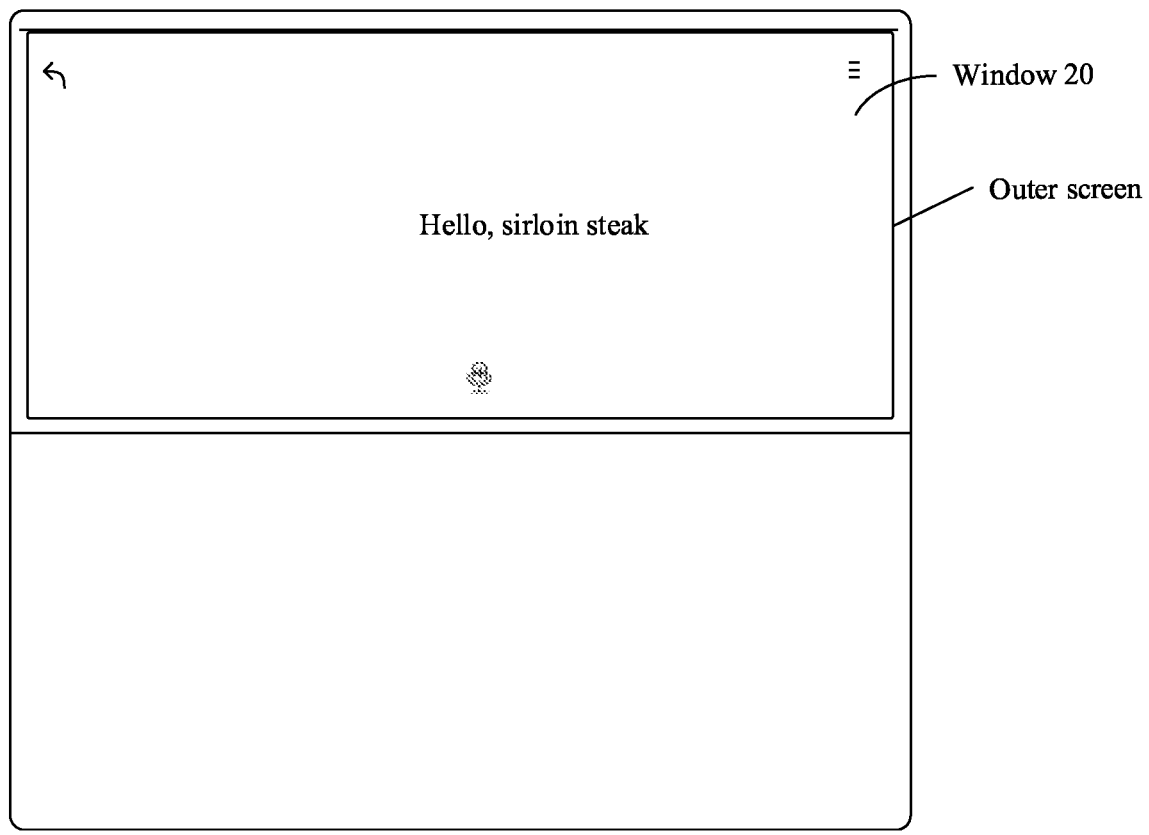

FIG. 6A-FIG. 6C are a schematic diagram of a landscape display interface of a first window and a second window. After a foldable mobile phone obtains an instruction of a user for triggering a Chinese-English translation dialog in translation software on an inner screen and requesting to translate Chinese "你好，来份西冷牛排" into English, an interface in FIG. 6A may be displayed. As shown in the interface in FIG. 6A, the inner screen presents a first window 10 and a second window 20. The first window 10 is used to display Chinese "你好，来份西冷牛排", and is located in a left part of the inner screen; and the second window 20 is used to display English "Hello, sirloin steak", and is located in a right part of the inner screen.

For example, the user taps a microphone icon and says "你好，来份西冷牛排". When detecting that the microphone icon is triggered, the foldable mobile phone may collect a sound of the user and display " 你好，来份西冷牛排 " in the first window 10. At the same time, the foldable mobile phone may display the translation "Hello, sirloin steak" in the second window 20.

If the foldable mobile phone collects image information of another user by using a rear-facing camera, the foldable mobile phone may display the first window 10 on the inner screen and enlarge an area corresponding to the first window 10 to the entire inner screen, which is shown in an interface in FIG. 6B. The foldable mobile phone may display the second window 20 on the outer screen and enlarge an area corresponding to the second window 20 to the entire outer screen, which is shown in an interface in FIG. 6C.

It should be understood that, if the foldable mobile phone collects image information of another user by using the rear-facing camera, the foldable mobile phone may also display the second window 20 on the inner screen and enlarge the area corresponding to the second window 20 to the entire inner screen; and may display the second window 10 on the outer screen and enlarge the area corresponding to the second window 10 to the entire outer screen.

Specifically, the processor 510 in the terminal device may obtain an instruction of the user for triggering a plurality of windows on the inner screen; display the first window 10 and the second window 20 on the inner screen in response to the instruction of the user for triggering the plurality of windows; obtain a first image by using a front-facing camera, where the first image includes image information of the user, and obtain a second image by using the rear-facing camera, where the second image includes image information of another user; and in response to the first image and the second image, display the first window 10 on the inner screen and enlarge the area corresponding to the first window 10 to the entire inner screen, and display the second window 20 on the outer screen and enlarge the area corresponding to the second window 20 to the entire outer screen, alternatively, display the second window 20 on the inner screen and enlarge the area corresponding to the second window 20 to the entire inner screen, and display the first window 10 on the outer screen and enlarge the area corresponding to the second window 10 to the entire outer screen.

Optionally, the foldable mobile phone may set a distance range between another user and the foldable mobile phone, to determine whether the user is a user using the foldable mobile phone. For example, the distance range may be set to [10, 80]. If the rear-facing camera of the foldable mobile phone detects that the user is within the distance range, the second window 20 or the first window 10 may be displayed on the outer screen.

Figure 7A:
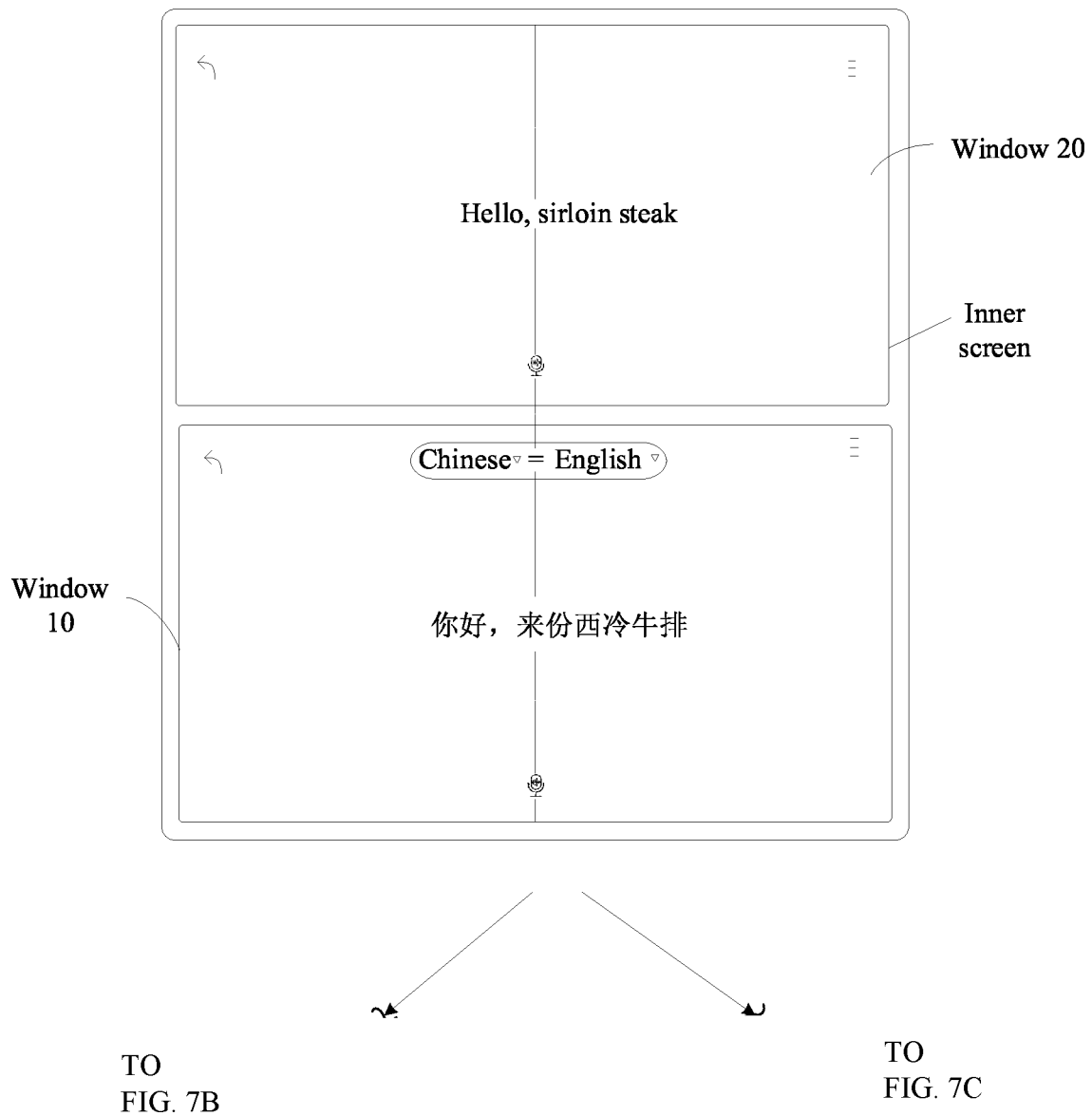
FIG. 7A-FIG. 7C are a schematic diagram of an interface of multi-window portrait display according to an embodiment of this application.
Figure 7B:
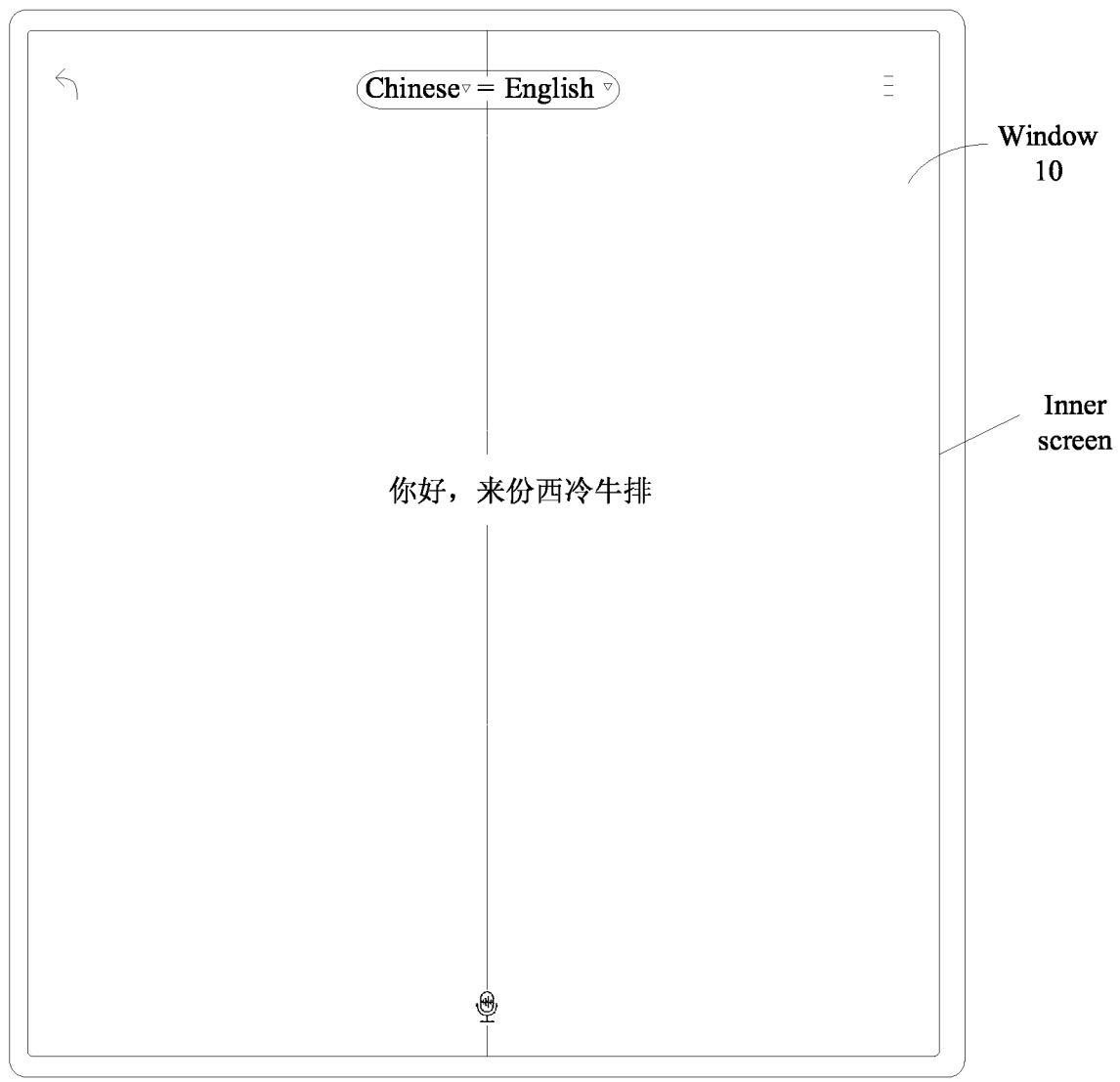
Figure 7C:
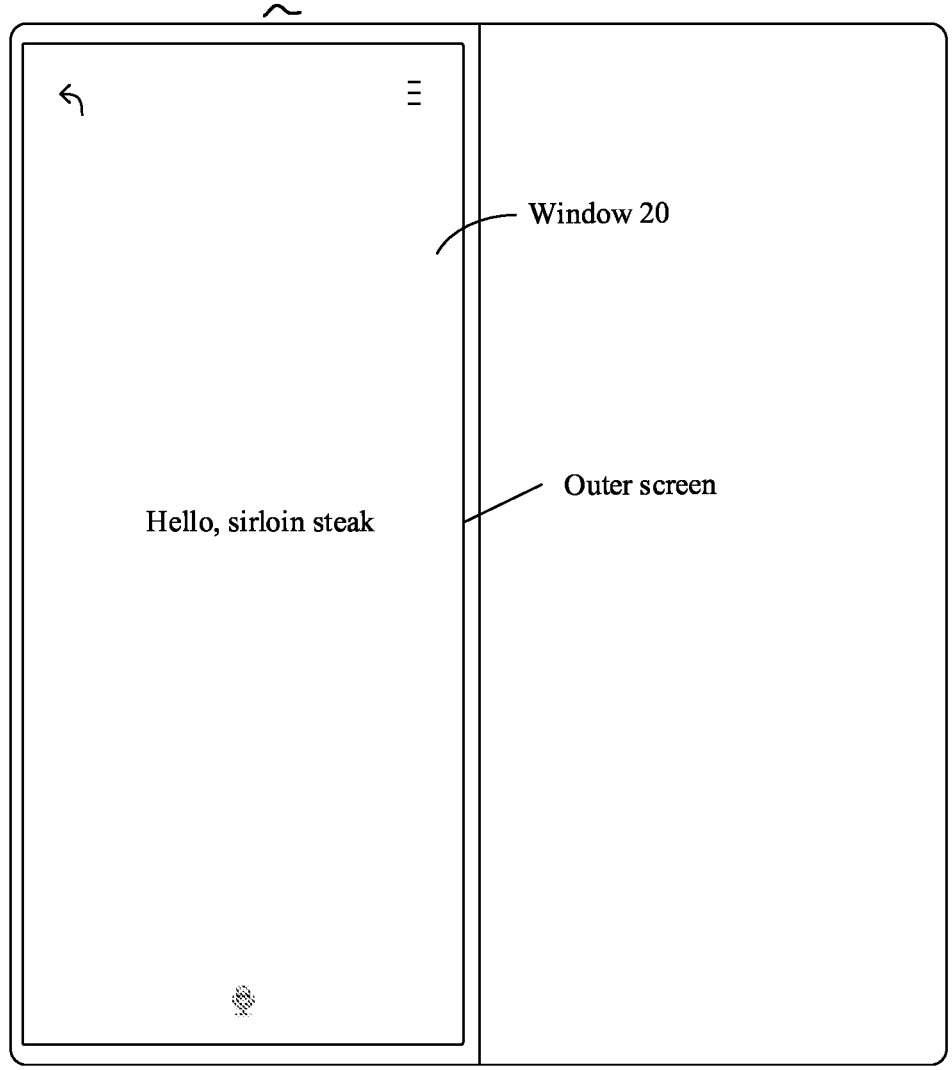

FIG. 7A-FIG. 7C are a schematic diagram of a portrait display interface of a first window and a second window. After a foldable mobile phone obtains an instruction of a user for triggering a Chinese-English translation dialog in translation software on an inner screen and requesting to translate Chinese "你好，来份西冷牛排" into English, an interface in FIG. 7A may be displayed. As shown in the interface in FIG. 7A, the inner screen presents a first window 10 and a second window 20. The first window 10 is used to display Chinese "你好，来份西冷牛排", and is located in a lower part of the inner screen; and the second window 20 is used to display English "Hello, sirloin steak", and is located in an upper part of the inner screen. If the foldable mobile phone collects image information of a user 2 by using a rear-facing camera, the foldable mobile phone may display the first window 10 on the inner screen and enlarge an area corresponding to the first window 10 to the entire inner screen, which is shown in an interface in FIG. 7B. The foldable mobile phone may display the second window 20 on the outer screen and enlarge an area corresponding to the second window 20 to the entire outer screen, which is shown in an interface in FIG. 7C.

According to the multi-window display method provided in this embodiment of this application, the foldable mobile phone may collect image information of a user by using a camera, to determine a display used by the user, and then provide more convenient experience for the user by using a front-rear display technology of the display.

Embodiment 2

Figure 8A:
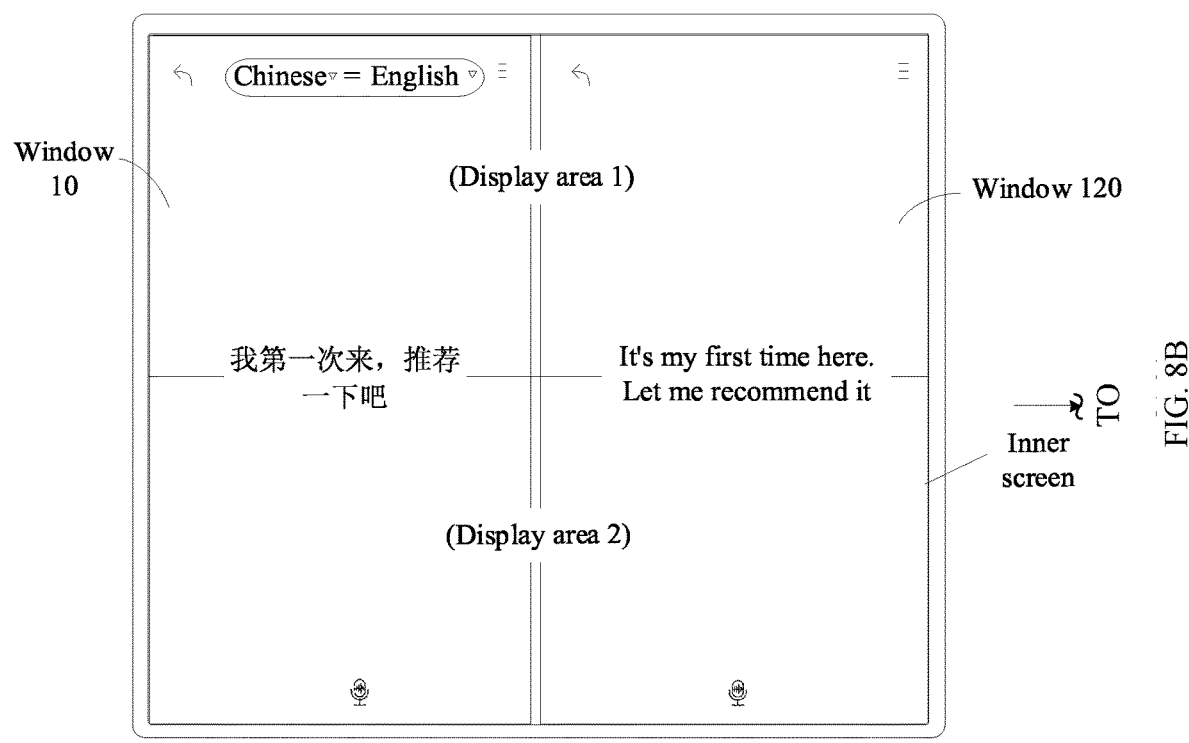
FIG. 8A-FIG. 8B are a flowchart of another interface of multi-window landscape display according to an embodiment of this application.
Figure 8B:
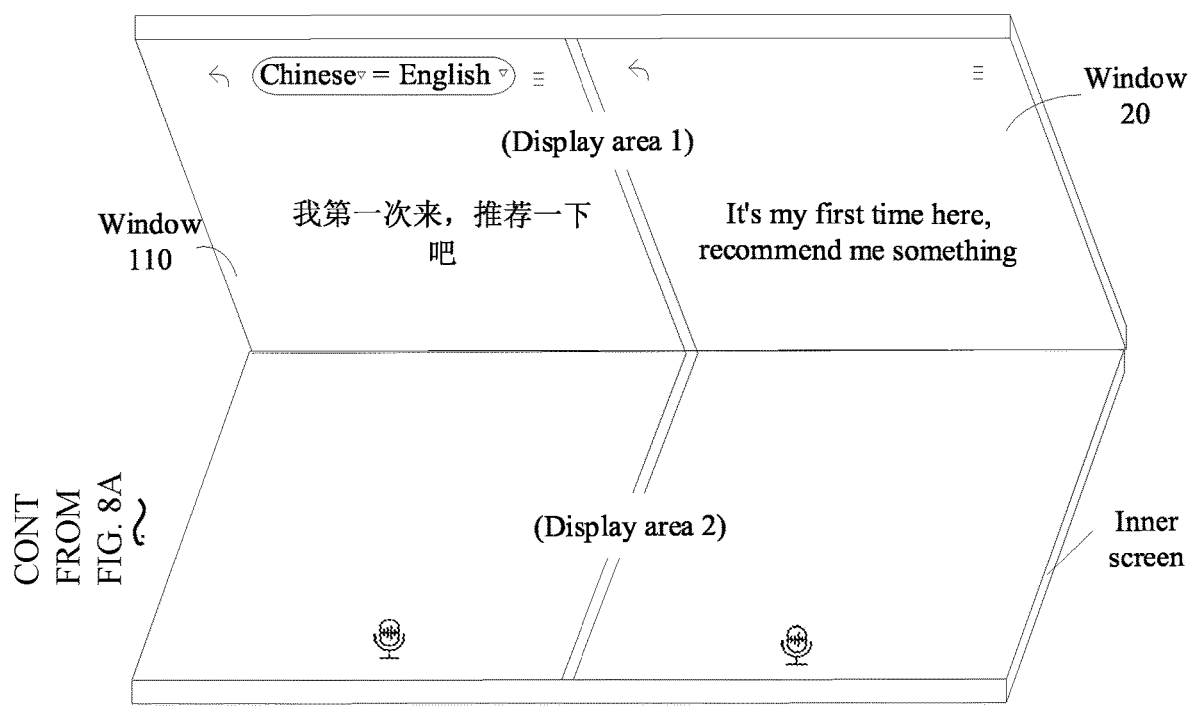

FIG. 8A-FIG. 8B are a schematic diagram of a landscape display interface of a first window and a second window. After a foldable mobile phone obtains an instruction of a user for triggering a Chinese-English translation dialog in translation software on an inner screen and requesting to translate Chinese "我第一次来，推荐一下吧" into English, an interface in FIG. 8A may be displayed. As shown in the interface in FIG. 8A, the inner screen presents a first window 10 and a second window 20. The first window 10 is used to display Chinese "我第一次来，推荐一下吧", and is located in a left part of the inner screen; and the second window 20 is used to display English "It's my first time here. Let me recommend it", and is located in a right part of the inner screen.

If the user folds the foldable mobile phone based on a foldable axis, which is shown in the interface in FIG. 8B, on a display interface of the inner screen, information within the first window may be displayed in the center of an upper part of the first window 10, and information within the second window 20 may be displayed in the center of an upper part of the second window. That is, both the information within the first window and the information within the second window is displayed in a display area 1 of the inner screen, to conform to a viewing habit of the user and improve user experience.

It should be understood that, if the foldable mobile phone displays the first window and the second window in a portrait display state, and the foldable mobile phone is in a folded state, the foldable mobile phone may move the information within the first window left to a central position of a left part of the first window, and move the information within the second window left to a central position of a left part of the second window, that is, both the information within the first window and the information within the second window is displayed in the display area 1 of the inner screen. Alternatively, the foldable mobile phone may move the information within the first window left to a central position of a left part of the first window, and move the information within the second window right to a central position of a right part of the second window, that is, the information within the first window is displayed in the display area 1 of the inner screen, and the information within the second window is displayed in a display area 2 of the inner screen. Alternatively, the foldable mobile phone may move the information within the first window right to a central position of a right part of the first window, and move the information within the second window right to a central position of a right part of the second window, that is, both the information within the first window and the information within the second window is displayed in a display area 2 of the inner screen.

Specifically, the processor 510 in the terminal device may obtain a folded state of the inner screen based on the foldable axis; and display the information within the first window 10 and the information within the second window 20 in the display area 1 or the display area 2 in response to the folded state. According to the multi-window display method provided in this embodiment of this application, the foldable mobile phone may automatically adjust a position of information within a window by detecting a folded state, so that manual operations are reduced, and user experience is improved.

Embodiment 3

Figure 9A:
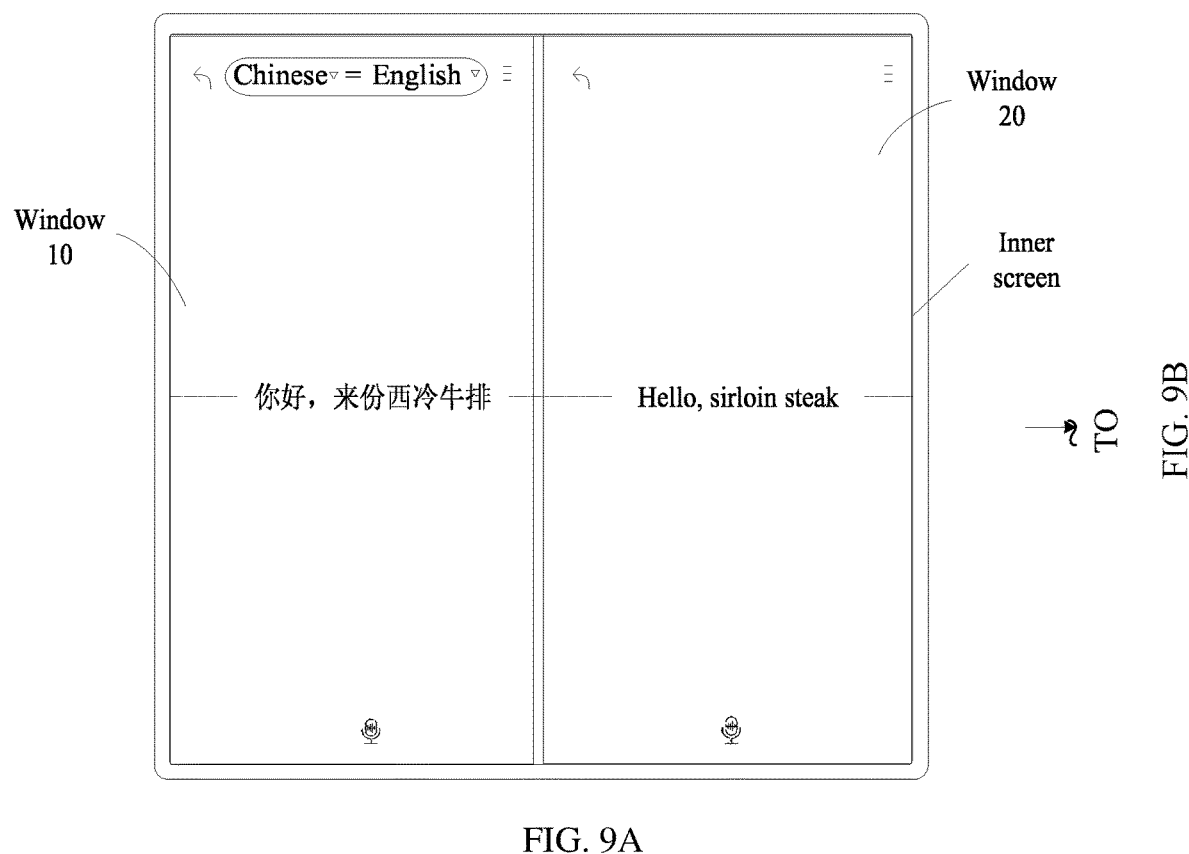
FIG. 9A-FIG. 9B are a schematic diagram of still another interface of multi-window landscape display according to an embodiment of this application.
Figure 9B:
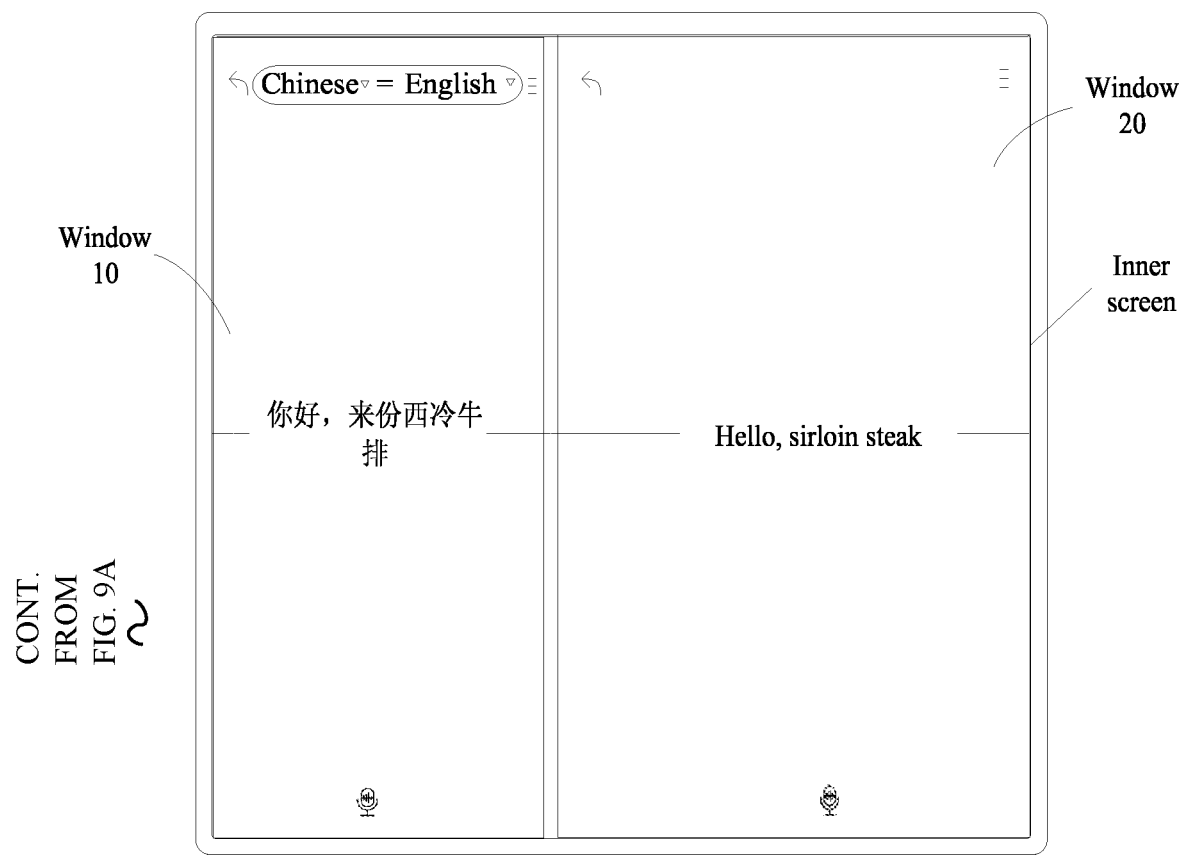

FIG. 9A-FIG. 9B are a schematic diagram of a landscape display interface of a first window and a second window. After a foldable mobile phone obtains an instruction of a user for triggering a Chinese-English translation dialog in translation software on an inner screen and requesting to translate Chinese "你好，来份西冷牛排" into English, an interface in FIG. 9A may be displayed. As shown in the interface in FIG. 9A, the inner screen of the foldable mobile phone presents a first window 10 and a second window 20. The first window 10 is used to display Chinese "你好，来份西冷牛排", and is located in a left part of the inner screen of the mobile phone; and the second window 20 is used to display English "Hello, sirloin steak", and is located in a right part of the inner screen of the mobile phone.

If there are two users using the foldable mobile phone, a distance between a user 1 and the foldable mobile phone is greater than a distance between a user and the foldable mobile phone, and at the same time, the user 1 speaks Chinese that corresponds to the first window 10, and the user 2 speaks English that corresponds to the second window 20, the foldable mobile phone reduces an area corresponding to the first window and enlarges a font in the first window, and correspondingly enlarges an area corresponding to the second window.

For example, the processor 510 in the terminal device may collect image information of the user 1 and the user 2 by using a front-facing camera, to determine a distance between the user 1 and the foldable mobile phone and a second distance between the user 2 and the foldable mobile phone. When the first distance is greater than the second distance, and a difference between the first distance and the second distance is greater than or equal to a first threshold and less than or equal to a second threshold, the foldable mobile phone reduces the area corresponding to the first window and enlarges the font in the first window, and correspondingly enlarges the area corresponding to the second window, that is, displays the reduced first window 10 and the enlarged second window 20 on the inner screen.

The foldable mobile phone may collect two pieces of image information of the user 1 and the user 2 at a same moment by using a binocular camera or two monocular cameras, to determine the first distance between the user 1 and the foldable mobile phone based on parallax of the user 1 under the two pieces of image information and the second distance between the user 2 and the foldable mobile phone based on parallax of the user 2 under the two pieces of image information.

It should be understood that the first threshold and the second threshold may be preset in the translation software. For example, the first threshold may be 10 cm, and the second threshold may be 80 cm.

It should be further understood that the foldable mobile phone may determine languages used by the user 1 and the user 2 by collecting sounds of the user 1 and the user 2 by using a microphone, to determine that the user 1 corresponds to the first window, and the user 2 corresponds to the second window.

It should be understood that, if a difference between the second distance from the user 2 to the foldable mobile phone and the first distance from the user 1 to the foldable mobile phone is greater than or equal to the first threshold and less than or equal to the second threshold, the foldable mobile phone reduces the area corresponding to the second window 20 and enlarges the font in the second window 20, and correspondingly enlarges the area corresponding to the first window 10. For specific implementation, refer to the foregoing descriptions. Details are not described herein again.

It should be further understood that the method is also applicable if the first window 10 and the second window 20 are displayed on the outer screen of the foldable mobile phone.

Figure 10A:
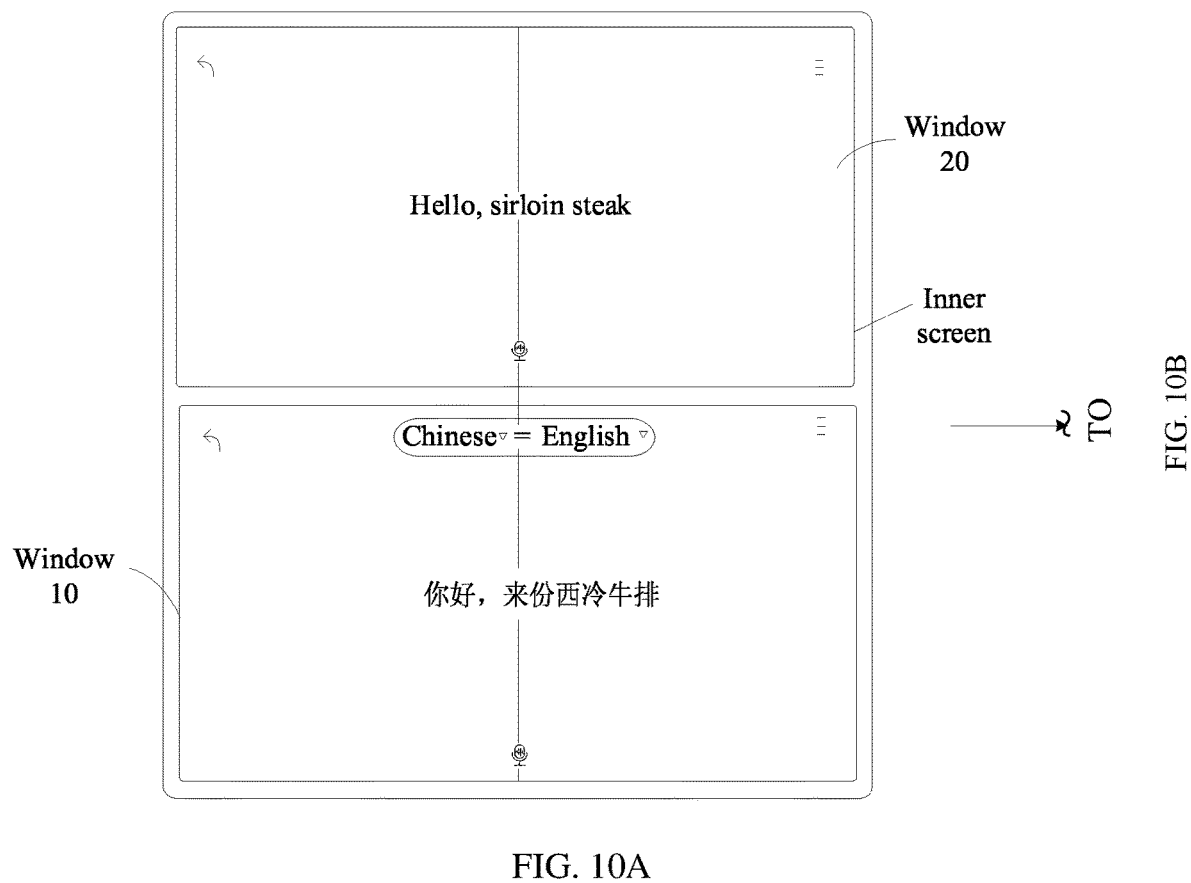
FIG. 10A-FIG. 10B are a schematic flowchart of another interface of multi-window portrait display according to an embodiment of this application.
Figure 10B:
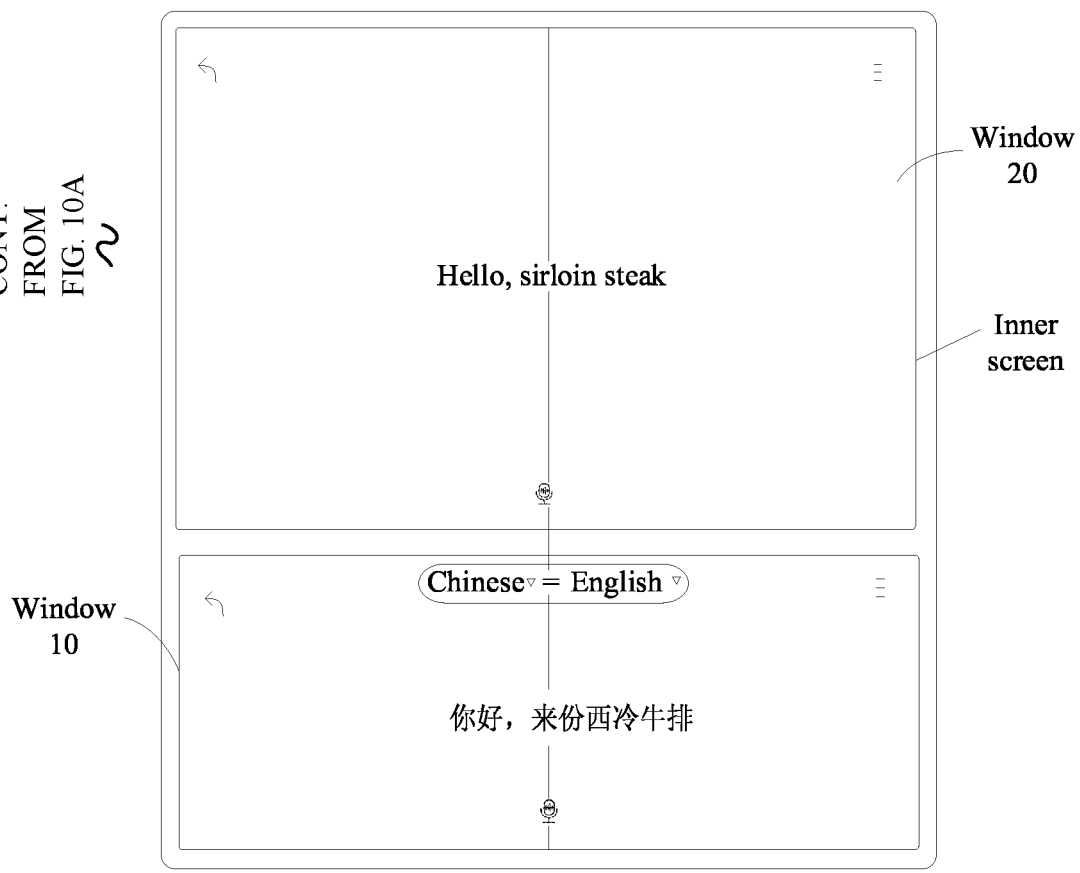

FIG. 10A-FIG. 10B are a schematic diagram of a portrait display interface of a first window and a second window. After a foldable mobile phone obtains an instruction of a user for triggering a Chinese-English translation dialog in translation software on an inner screen and requesting to translate Chinese "你好，来份西冷牛排" into English, an interface in FIG. 10A may be displayed. As shown in the interface in FIG. 10A, the inner screen of the mobile phone presents a first window 10 and a second window 20. The first window 10 is used to display Chinese "你好，来份西冷牛排", and is located in a lower part of the inner screen of the mobile phone; and the second window 20 is used to display English "Hello, sirloin steak", and is located in an upper part of the inner screen of the mobile phone.

As shown in an interface in FIG. 10B, when the foldable mobile phone detects that a first distance between the user 1 and the mobile phone is greater than a second distance between the user 2 and the foldable mobile phone, the foldable mobile phone automatically reduces the area corresponding to the first window 10 to concentrate attention of the user 1, and enlarges the font of content in the first window 10, so that the user 1 can still see the font clearly when the user 1 is relatively far from the foldable mobile phone. Correspondingly, the foldable mobile phone may enlarge the area corresponding to the second window 20, so that the user 2 can see a relatively large area, to improve experience of the user 2. It should be understood that, in this example, the foldable mobile phone may determine languages used by the user 1 and the user 2 by collecting sounds of the user 1 and the user 2 by using a microphone, to determine that the user 1 corresponds to the first window 10, and the user 2 corresponds to the second window 20.

According to the multi-window display method provided in this embodiment of this application, an area corresponding to the first window and an area corresponding to the second window may be automatically adjusted by detecting a distance between a user and the foldable mobile phone, so that manual operations are reduced, and user experience is improved.

The foldable mobile phone may reduce the area corresponding to the first window in two implementations. In one implementation, the foldable mobile phone determines a ratio of the first distance to the second distance as a ratio of a first window area to a second window area, and adjusts the first window area and the second window area based on the ratio. For example, when the first distance is 30 cm and the second distance is 50 cm, the ratio of the first window area to the second window area is 3:5, and then resolution and a pixel of the screen may be adjusted based on the ratio, to change the first window area and the second window area.

In another implementation, when the foldable mobile phone may set the difference between the first distance and the second distance to 10 cm, a length or width of a first area is reduced by 10%, and correspondingly, a length or width of a second area is increased by 10%; or when the difference between the first distance and the second distance is 20 cm, a length or width of a first area is reduced by 20%, and correspondingly, a length or width of a second area is increased by 10%; or when the difference between the first distance and the second distance is 20 cm, a length or width of a first area is reduced by 30%, and correspondingly, a length or width of a second area is increased by 30%. The foldable mobile phone may directly reduce a length or width of the first window area by a corresponding percentage and reduce a length or width of the second window area by a corresponding percentage based on a difference between the first distance and the second distance.

It should be understood that, to ensure user experience, the foldable mobile phone may set a maximum range value and a minimum range value of a window area, that is, the foldable mobile phone may be arbitrarily adjusted within a minimum range of the area and a maximum range of the area. For example, the foldable mobile phone may set a maximum ratio of the first window to the second window to 1:2 or 2:1. For another example, the foldable mobile phone may set a maximum ratio of the first window to the second window to 2:3 or 3:2. That the foldable mobile phone enlarges the font in the first window may be: The foldable mobile phone enlarges the font based on a scaling proportion of the first window, for example, when the scaling proportion of the first window is 20%, the font is increased by two font sizes; or may be: The foldable mobile phone presets an enlarged font size, for example, when the first window is reduced (regardless of how much the first window is reduced), the font is increased by one font size.

As an optional embodiment, the foldable mobile phone may also collect a sound of the user 1 and a sound of the user 2 by using the microphone, to automatically adjust a size of a window by comparing a distance between the sound of the user 1 and the sound of the user 2. For example, the foldable mobile phone collects sounds of the user 1 and the user 2 by using the microphone to determine languages used by the user 1 and the user 2, to determine that the user 1 corresponds to the first window, and the user 2 corresponds to the second window. If the sound of the user 1 is farther than the sound of the user 2, the foldable mobile phone may reduce the area corresponding to the first window and enlarge the font of the content in the first window, so that the user 1 can still see the font clearly when the user 1 is relatively far from the mobile phone. Correspondingly, the foldable mobile phone may enlarge the area corresponding to the second window 20, so that the user 2 can see a larger area.

As an optional embodiment, in the foregoing method, the foldable mobile phone may not increase the font in the first window, but may reduce only the area corresponding to the first window.

Embodiment 4

Figure 11:
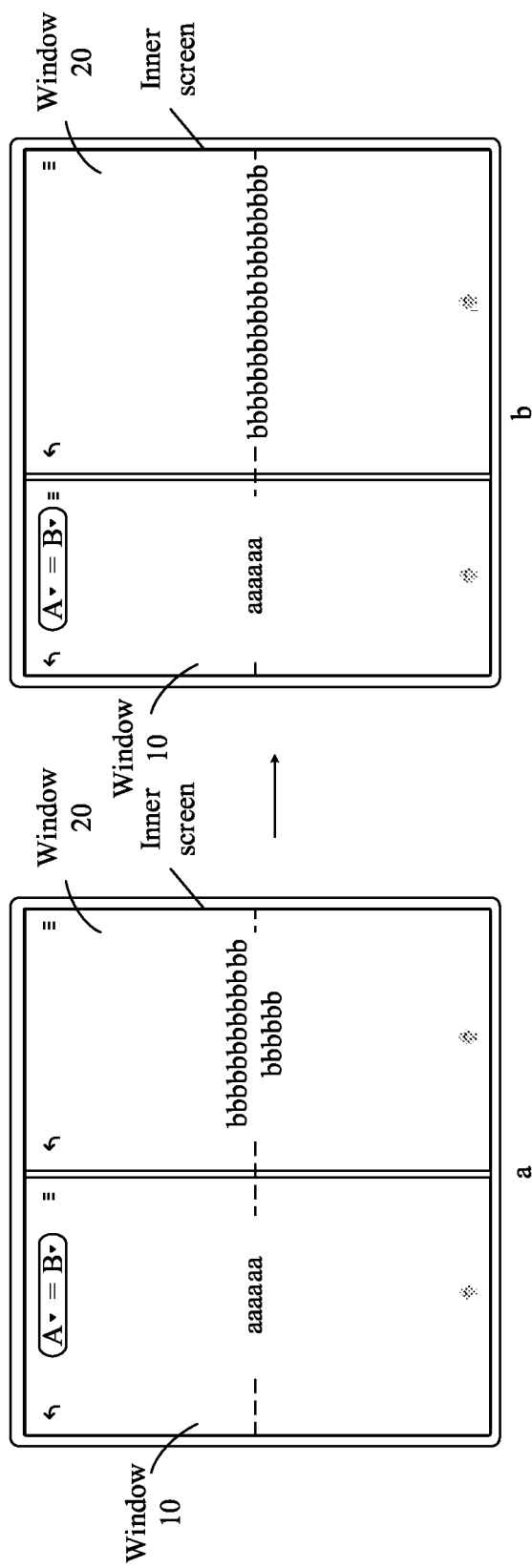
FIG. 11 is a schematic diagram of still another interface of multi-window landscape display according to an embodiment of this application.

FIG. 11 is a schematic diagram of a landscape display interface of a first window and a second window. After a foldable mobile phone obtains an instruction of a user for triggering an A-B translation dialog in translation software on an inner screen and requesting to translate an A language "aaaaaa" into a B language, an interface a in FIG. 11 may be displayed. As shown in the interface a in FIG. 11, the inner screen of the foldable mobile phone presents a first window 10 and a second window 20. The first window 10 is used to display the A language "aaaaaa", and is located in a left part of the inner screen of the mobile phone; and the second window 20 is used to display the B language "bbbbbbbbbbbbbbbbbbbb", and is located in a right part of the inner screen of the mobile phone.

An information amount of the B language in the second window 20 is significantly greater than an information amount of the A language in the first window 10. As shown in an interface b in FIG. 11, an area corresponding to the second window 20 is significantly larger than an area corresponding to the first window 10.

The processor 510 in the foldable mobile phone may detect a first information amount of the first window 10, or may detect a second information amount of the first window 20. For example, the information amount may be a quantity of bits or a quantity of bytes.

When the first information amount is greater than the second information amount, and a difference between the first information amount and the second information amount is greater than or equal to a third threshold, the enlarged first window and the reduced third window are displayed on a first display.

Alternatively, when the second information amount is greater than the first information amount, and a difference between the second information amount and the first information amount is greater than or equal to a third threshold, the reduced first window and the enlarged third window are displayed on a first display.

It should be understood that the third threshold may be preset in the translation software. For example, the third threshold may be 10 bytes.

It should be understood that, if the foldable mobile phone detects that an information amount within the first window 10 is greater than an information amount within the second window 20, the foldable mobile phone enlarges the area corresponding to the first window 10 to accommodate the information within the first window 10, and correspondingly, reduces the area corresponding to the second window 20 to accommodate the information within the second window 20.

It should be further understood that the method is also applicable if the first window 10 and the second window 20 are displayed on the outer screen of the foldable mobile phone.

Figure 12:
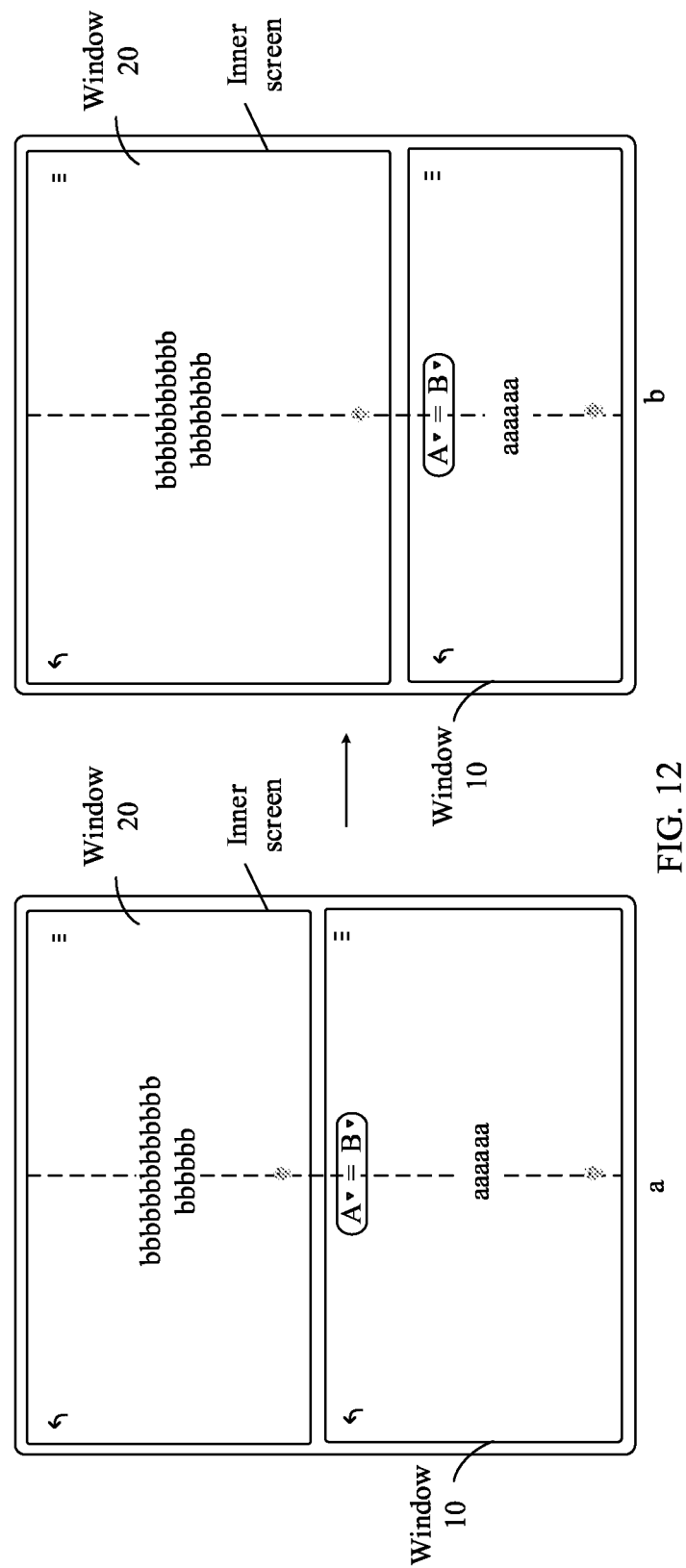
FIG. 12 is a schematic diagram of still another interface of multi-window portrait display according to an embodiment of this application.

FIG. 12 is a schematic diagram of a portrait display interface of a first window and a second window. After a foldable mobile phone obtains an instruction of a user for triggering an A-B translation dialog in translation software on an inner screen and requesting to translate an A language "aaaaaa" into a B language, an interface a in FIG. 12 may be displayed. As shown in the interface a in FIG. 12, the inner screen of the foldable mobile phone presents a first window 10 and a second window 20. The first window 10 is used to display the A language "aaaaaa", and is located in a lower part of the inner screen of the mobile phone; and the second window 20 is used to display the B language "bbbbbbbbbbbbbbbbbbbb", and is located in an upper part of the inner screen of the mobile phone.

As shown in an interface b in FIG. 12, if the foldable mobile phone detects that an information amount "bbbbbbbbbbbbbbbbbbbb" within the second window 20 is greater than an information amount "aaaaaa" within the first window 10, the foldable mobile phone enlarges the area corresponding to the second window 20 to accommodate the information within the second window 20, and correspondingly, reduces the area corresponding to the first window 10 to accommodate the information within the first window 10.

According to the multi-window display method provided in this embodiment of this application, a size of a window may be automatically adjusted by detecting an information amount within the window, so that manual operations are reduced, and user experience is improved.

Embodiment 5

Figure 13A:
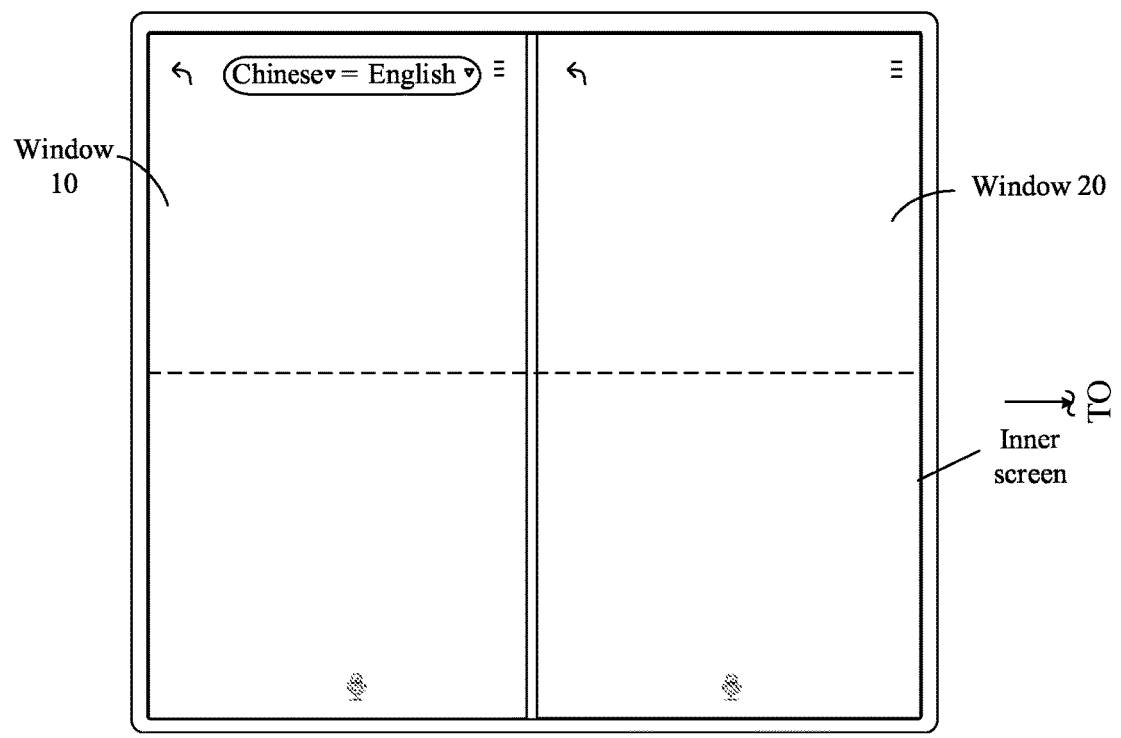
FIG. 13A-FIG. 13B are a schematic diagram of still another interface of multi-window landscape display according to an embodiment of this application.
Figure 13B:
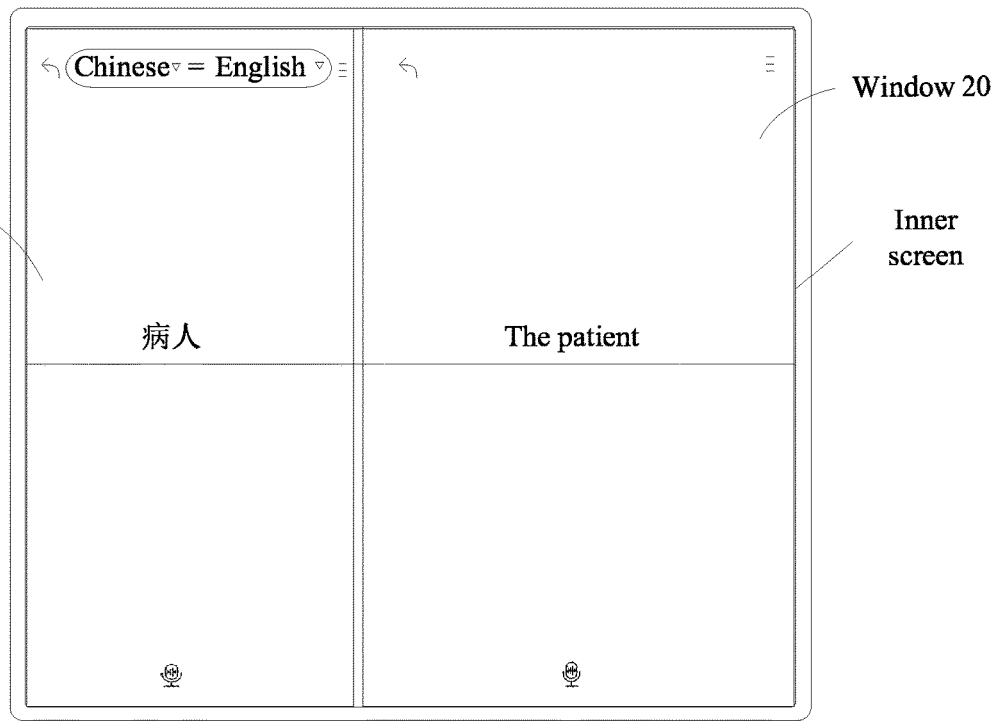

FIG. 13A-FIG. 13B are a schematic diagram of a landscape display interface of a first window and a second window. After a foldable mobile phone obtains an instruction of a user for triggering a Chinese-English translation dialog in translation software on an inner screen, an interface in FIG. 13A may be displayed. As shown in the interface in FIG. 13A, the inner screen of the foldable mobile phone presents a first window 10 and a second window 20. The first window 10 is used to display Chinese, and is located in a left part of the inner screen of the mobile phone; and the second window 20 is used to display English, and is located in a right part of the inner screen of the mobile phone.

The user may tap a microphone icon and say a word, and therefore the foldable mobile phone records the sound of the user and displays sound content in the window. As shown in an interface in FIG. 13B, if a sound of the user collected by the foldable mobile phone by using a microphone control is Chinese "病人", the foldable mobile displays the Chinese "病人" in the first window 10, reduces an area corresponding to the first window 10, enlarges an area corresponding to the second window 20, and simultaneously displays English "The patient" in the second window 20.

It should be understood that, in this scenario, the user prefers to see translated content, in other words, content of the second window 20, and therefore the foldable mobile phone may automatically reduce the area corresponding to the first window 10, and correspondingly enlarge the area corresponding to the second window 20.

It should be understood that, if a sound of the user collected by the foldable mobile phone by using the microphone is English, the foldable mobile phone may reduce the area corresponding to the second window 20 and enlarge the area corresponding to the first window 10.

The processor 510 in the foldable mobile phone may collect a sound of the user by using the microphone, to determine a language used by the user; determine a window corresponding to the user based on the language used by the user; and display the reduced first window 10 and the enlarged second window 20 on the inner screen.

It should be understood that the method is also applicable if the first window 10 and the second window 20 are displayed on the outer screen of the foldable mobile phone.

Figure 14A:
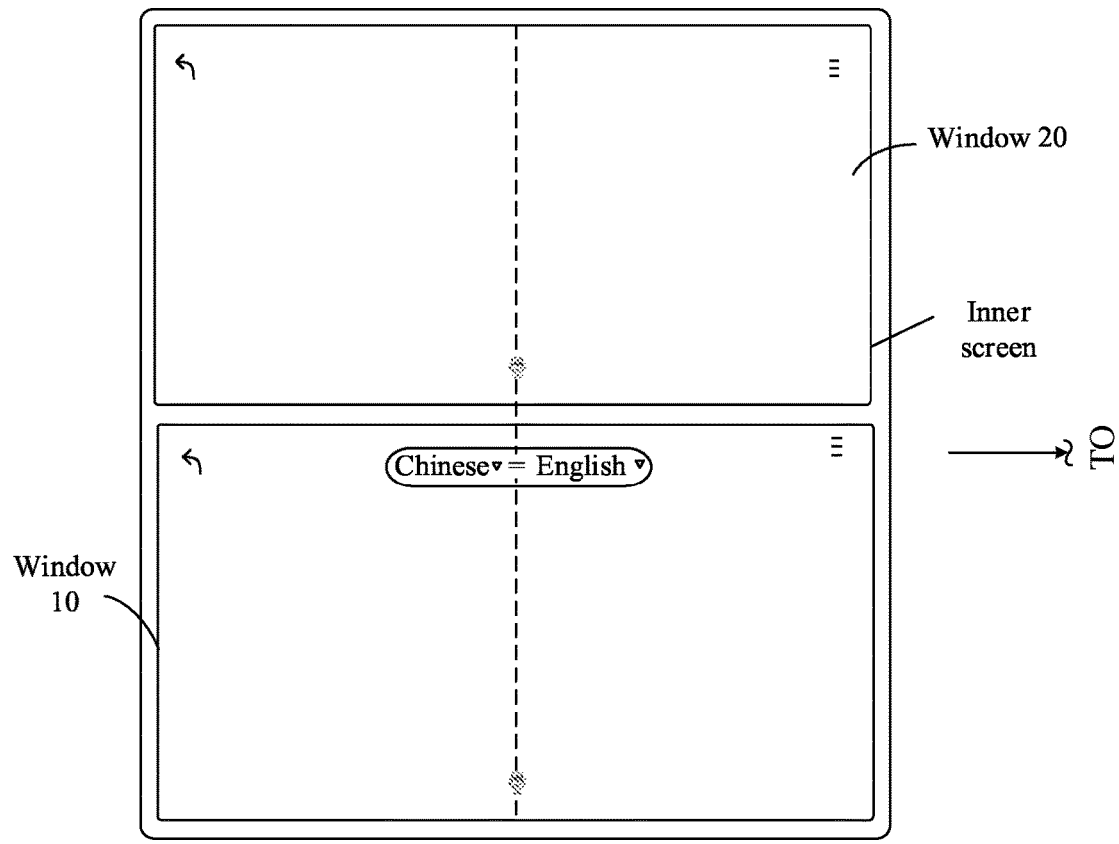
FIG. 14A-FIG. 14B are a schematic diagram of still another interface of multi-window portrait display according to an embodiment of this application.
Figure 14B:
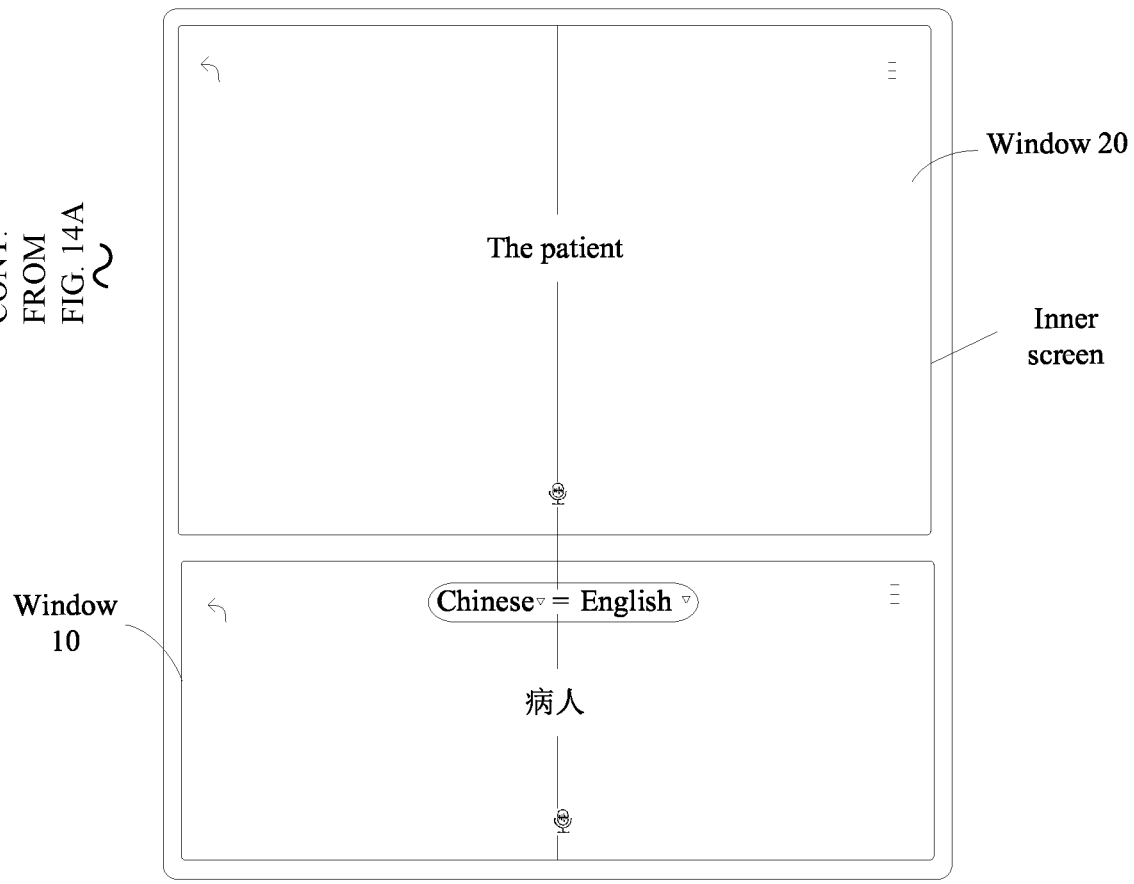

FIG. 14A-FIG. 14B are a schematic diagram of a portrait display interface of a first window and a second window. After a foldable mobile phone obtains an instruction of a user for triggering a Chinese-English translation dialog in translation software on an inner screen, an interface in FIG. 14A may be displayed. As shown in the interface in FIG. 14A, the inner screen of the foldable mobile phone presents a first window 10 and a second window 20. The first window 10 is used to display Chinese, and is located in a lower part of the inner screen of the mobile phone; and the second window 20 is used to display English, and is located in an upper part of the inner screen of the mobile phone.

As shown in an interface in FIG. 14B, if a sound of the user collected by the foldable mobile phone by using a microphone control is Chinese "病人", the foldable mobile phone may reduce the area corresponding to the first window 10 and enlarge the area corresponding to the second window 20.

According to the multi-window display method provided in this embodiment of this application, in a multi-window display interface, the foldable mobile phone may determine a language of the user by detecting a voice of the user by using the microphone, and then automatically enlarges a window of a translated language, so that manual operations are reduced, and user experience is improved.

Embodiment 3 to Embodiment 5 may be further applied to any terminal device having a display in addition to the terminal device having a foldable screen.

Optionally, in Embodiment 3 to Embodiment 5, a sum of a size of the reduced first window and a size of the enlarged second window is equal to a sum of a size of the first window and a size of the second window. Alternatively, a sum of a size of the enlarged first window and a size of the reduced second window is equal to a sum of a size of the first window and a size of the second window.

Optionally, in Embodiment 3 to Embodiment 5, a size of the reduced first window may be one-third of a size of the inner screen or the outer screen, and a size of the enlarged second window may be two-thirds of a size of the inner screen or the outer screen. Alternatively, a size of the enlarged first window may be two-thirds of a size of the inner screen or the outer screen, and a size of the reduced second window may be one-third of a size of the inner screen or the outer screen.

Optionally, in Embodiment 3 to Embodiment 5, a size of the reduced first window may be two-fifths of a size of the inner screen or the outer screen, and a size of the enlarged second window may be three-fifths of a size of the inner screen or the outer screen. Alternatively, a size of the enlarged first window may be three-fifths of a size of the inner screen or the outer screen, and a size of the reduced second window may be two-fifths of a size of the inner screen or the outer screen.

The multi-window display methods provided in Embodiment 1 to Embodiment 5 may be combined arbitrarily, and may be applied to the foldable mobile phone. For example, assuming that a user 1 wants to talk with a user 2 by using Chinese-English translation of translation software in the foldable mobile phone, the inner screen of the foldable mobile phone may display a first window and a second window. The first window is used to display Chinese, and the second window is used to display English. The foldable mobile phone may collect a sound of the user 1 by using the microphone and identify the sound of the user 1 as a to-be-translated language to be displayed in the first window, or may collect a sound of the user 2 by using the microphone and identify the sound of the user 2 as a to-be-translated language to be displayed in the second window.

If the foldable mobile phone detects the sound of the user 1, the foldable mobile phone collects a voice of the user 1 and identifies the voice of the user 1 as a to-be-translated language to be displayed in the first window. In addition, the foldable mobile phone reduces an area corresponding to the first window, and correspondingly, displays the English translation in the second window, and enlarges an area corresponding to the second window, so that the user 2 can view the English translation. If the foldable mobile phone detects the sound of the user 2, the foldable mobile phone collects a voice of the user 2 and identifies the voice of the user 2 as a to-be-translated language to be displayed in the second window. In addition, the foldable mobile phone reduces an area corresponding to the second window, and correspondingly, displays the Chinese translation in the first window, and enlarges an area corresponding to the first window, so that the user 1 can view the Chinese translation.

During conversation between the user 1 and the user 2, as information within the windows increases, the foldable mobile phone may detect information amounts within the two windows, and adaptively enlarge a window with a large information amount and adaptively reduce a window with a small information amount.

If the user 2 moves to an opposite side of the user 1, the foldable mobile phone may detect image information of the user 2 by using a rear-facing camera, and the foldable mobile phone displays the second window on the outer screen of the foldable mobile phone, and enlarges the first window on the entire inner screen. If a front-facing camera detects that a user 3 and the user 1 are in one image, and a language that is used by the user 3 and that is collected by the microphone is French, the foldable mobile phone may add a third window to the inner screen for displaying French.

If the foldable mobile phone detects that a distance between the user 3 and the foldable mobile phone is greater than a distance between the user 2 and the foldable mobile phone, the foldable mobile phone may reduce an area corresponding to the third window and enlarge a font in the third window.

For example, the user 1 and the user 2 may talk with each other by using English-Chinese translation of translation software in the foldable mobile phone. A conversation scenario may be a restaurant. The user 1 may be a restaurant attendant, and the user 2 may be a dining person. As shown in an interface in FIG. 15A, the user 1 may tap a microphone icon and say English "Welcome! What can I help you" to ask the user 2. After detecting that the microphone icon is triggered, the foldable mobile phone collects the sound of the user 1 by using the microphone, displays "Welcome! What can I help you" in the first window 10, and displays the Chinese translation "您好！您要吃点什么," in the second window 20. In this case, the user 1 wants the user 2 to see the Chinese translation, and therefore the foldable mobile phone reduces the area corresponding to the first window 10 and enlarges the area corresponding to the second window 20.

Figure 15A:
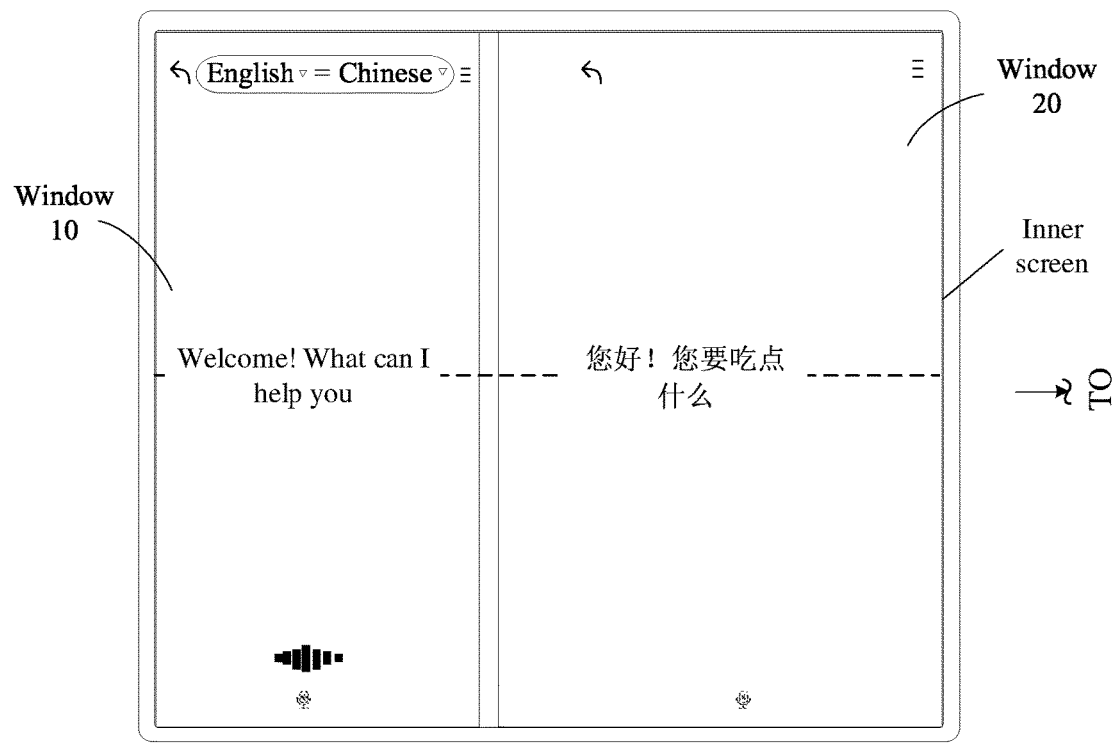
FIG. 15A-FIG. 15B are a schematic diagram of still another interface of multi-window landscape display according to an embodiment of this application.
Figure 15B:
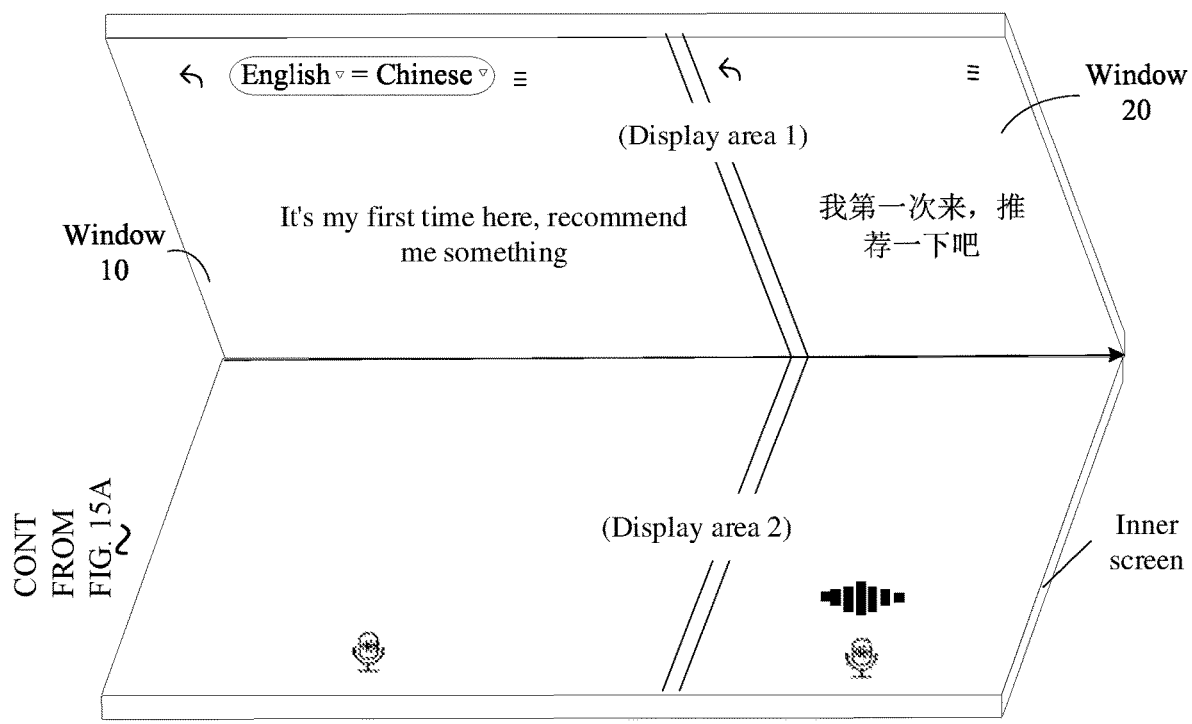

As shown in an interface in FIG. 15B, after seeing the Chinese translation, the user 2 may tap the microphone icon and say Chinese "我第一次来，推荐一下吧" to answer the user 1. After detecting that the microphone icon is triggered, the foldable mobile phone collects the sound of the user 2 by using the microphone, displays "我第一次来，推荐一下吧" in the second window 20, and displays the English translation "It's my first time here, recommend me something" in the first window 10. In this case, the user 2 wants the user 1 to see the English explanation, and therefore the foldable mobile phone reduces the area corresponding to the second window 20, and enlarges the area corresponding to the first window 10. In addition, the user 2 folds the foldable mobile phone based on a foldable axis, and "It's my first time here, recommend me something" within the first window 10 and "我第一次来，推荐一下吧" within the second window 20 are displayed in a display area 1 of the inner screen.

It should be understood that sequence numbers of the foregoing processes do not mean execution sequences. The execution sequences of the processes should be determined based on functions and internal logic of the processes, and should not be construed as any limitation on the implementation processes of embodiments of this application.

In the foregoing embodiments provided in this application, the method provided in this embodiment of this application is introduced from the perspective of the terminal device (which uses a foldable mobile phone as an example) as an execution body. To implement functions in the foregoing methods provided in the embodiments of this application, the terminal device may include a hardware structure and/or a software module, so as to implement the foregoing functions by using a hardware structure, a software module, or a combination of a hardware structure and a software module. Whether one of the functions is executed by using a hardware structure, a software structure, or a hardware structure plus a software structure depends on particular applications and design constraints of the technical solutions.

A terminal device provided in an embodiment of this application is described in detail below with reference to FIG. 16.

Figure 16:
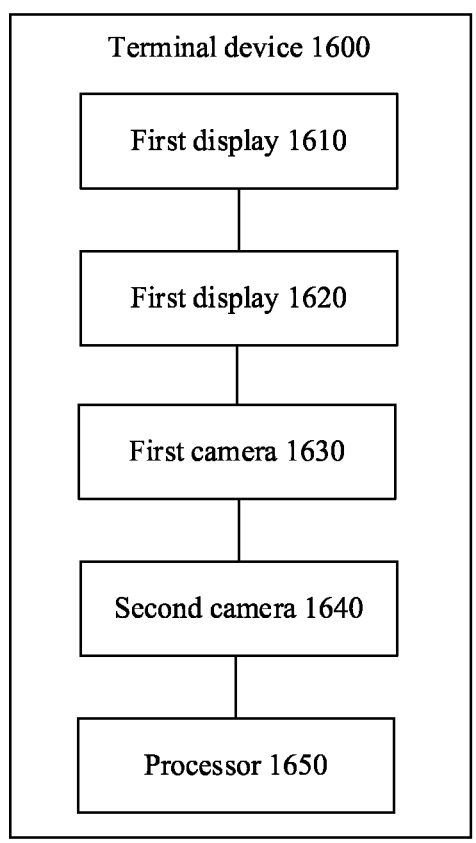
FIG. 16 is a schematic block diagram of a terminal device according to an embodiment of this application.

FIG. 16 shows another terminal device 1600 according to this embodiment of this application. The terminal device 1600 includes: a first display 1610, a second display 1620, a first camera 1630, a second camera 1640, and a processor 1650. The first display 1610 and the first camera 1630 are located in a first area of the terminal device, and the second display 1620 and the second camera 1640 are located in a second area of the terminal device, where the first area and the second area are located on different sides of the terminal device.

The processor 1650 is configured to: obtain an instruction of a first user for triggering a plurality of windows on the first display; display a first window and a second window on the first display in response to the instruction of the first user for triggering the plurality of windows; obtain a first image by using the first camera, and obtain a second image by using the second camera, where the first image includes the first user, and the second image includes a second user; and in response to the first image and the second image, display the first window on the first display, and display the second window on the second display, or display the second window on the first display, and display the first window on the second display.

Optionally, the first display further displays a third window, and the first display is a foldable screen including a first display area and a second display area, where the first display area and the second display area are determined based on a foldable axis of the first display. The processor 1650 is further configured to: obtain a folded state of the first display based on the foldable axis; and display information within the first window and information within the third window in the first display area or the second display area in response to the folded state.

Optionally, the first display further displays a third window, and the terminal device further includes a microphone. The processor 1650 is further configured to: collect a sound of the first user by using the microphone, and determine a language used by the first user; determine, based on the language used by the first user, that the first user corresponds to the first window; and display the reduced first window and the enlarged third window on the first display.

Optionally, the first image further includes a third user, the first display further displays a third window, and the terminal device 1600 further includes a microphone. The processor 1650 is further configured to: determine a first distance between the first user and the terminal device and a second distance between the third user and the terminal device based on the first image; collect a sound of the first user and a sound of the third user by using the microphone; determine, based on the sound of the first user and the sound of the third user, a language used by the first user and a language used by the third user; determine, based on the language used by the first user and the language used by the third user, that the first user corresponds to the first window and the third user corresponds to the third window; and when the first distance is greater than the second distance, and a difference between the first distance and the second distance is greater than or equal to a first threshold and less than or equal to a second threshold, display the reduced first window and the enlarged third window on the first display.

Optionally, the first display further displays a third window. The processor 1650 is further configured to: detect a first information amount within the first window; detect a second information amount within the third window; and when the first information amount is greater than the second information amount, and a difference between the first information amount and the second information amount is greater than or equal to a third threshold, display the enlarged first window and the reduced third window on the first display; or when the second information amount is greater than the first information amount, and a difference between the second information amount and the first information amount is greater than or equal to a third threshold, display the reduced first window and the enlarged third window on the first display.

Optionally, a sum of a size of the reduced first window and a size of the enlarged third window is equal to a sum of a size of the first window and a size of the third window.

Optionally, the size of the reduced first window is one-third of a size of the first display, and the size of the enlarged third window is two-thirds of the size of the first display; or the size of the reduced first window is two-fifths of a size of the first display, and the size of the enlarged third window is three-fifths of the size of the first display.

Optionally, the first camera and/or the second camera are/is (a) low power consumption camera(s). The first image includes profile information of the first user, and the second image includes profile information of the second user.

It should be understood that the terminal device 1600 may be specifically the foldable mobile phone in the foregoing embodiments, or a function of the foldable mobile phone in the foregoing embodiments may be integrated into the terminal device 1600. The terminal device 1600 may be configured to perform steps and/or processes corresponding to the foldable mobile phone in the method embodiments.

An embodiment of this application further provides another terminal device. The terminal device includes: an obtaining module and a processing module.

The obtaining module is configured to: obtain an instruction of a first user for triggering a plurality of windows on a first display. The processing module is configured to: display a first window and a second window on the first display in response to the instruction of the first user for triggering the plurality of windows; obtain a first image by using a first camera, and obtain a second image by using a second camera, where the first image includes the first user, and the second image includes a second user; and in response to the first image and the second image, display the first window on the first display, and display the second window on a second display, or display the second window on the first display, and display the first window on a second display.

It should be understood that the terminal device herein is embodied in a form of a functional module. The term "module" herein may be an application specific integrated circuit (application specific integrated circuit, ASIC), an electronic circuit, a processor for executing one or more software or firmware programs (for example, a shared processor, a dedicated processor, or a processor group), a memory, a combinational logic circuit, and/or another suitable component supporting the described functions. In an optional example, a person skilled in the art may understand that the terminal device may be specifically the foldable mobile phone in the foregoing embodiments, or a function of the foldable mobile phone in the foregoing embodiments may be integrated into the terminal device. The terminal device may be configured to perform processes and/or steps corresponding to the foldable mobile phone in the method embodiments. To avoid repetition, details are not described herein again.

The terminal device has a function of implementing corresponding steps performed by the foldable mobile phone in the foregoing method. The function may be implemented by using hardware, or may be implemented by corresponding software executed by hardware. The hardware or software includes one or more modules corresponding to the foregoing function.

In this embodiment of this application, the terminal device may alternatively be a chip or a chip system, for example, a system on chip (system on chip, SoC).

This application further provides a computer-readable storage medium. The computer-readable storage medium is used to store a computer program, and the computer program is used to implement the method corresponding to the foldable mobile phone in the method embodiments.

This application further provides a chip system. The chip system is configured to support the foldable mobile phone in the method embodiments in implementing the functions shown in embodiments of this application.

This application further provides a computer program product. The computer program product includes a computer program (which may also be referred to as code or instructions), and when the computer program is run on a computer, the computer may perform the method corresponding to the foldable mobile phone shown in the method embodiments.

A person of ordinary skill in the art may be aware that units and algorithm steps in examples described with reference to embodiments disclosed in this specification can be implemented as electronic hardware or a combination of computer software and electronic hardware. Whether the functions are implemented by hardware or software depends on specific applications and design constraints of the technical solutions. A person skilled in the art may use different methods to implement the described functions for specific applications, but it should not be considered that the implementation goes beyond the scope of this application.

A person skilled in the art can clearly understand that for convenience and conciseness of description, for specific working processes of the foregoing described system, apparatus and unit, reference can be made to the corresponding processes in the foregoing method embodiments, and details are not described herein.

In several embodiments provided in this application, it should be understood that the disclosed system, apparatus, and method may be implemented in another manner. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. Some or all of the units may be selected according to actual needs to achieve the purpose of the solutions in the embodiments.

In addition, functional units in embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but the protection scope of this application is not limited thereto. Any person skilled in the art can easily conceive modifications or replacements within the technical scope of this application, and these modifications or replacements shall fall within the protection scope of this application. Therefore, the protection scope of this application should be subject to the protection scope of the claims.

What is claimed is:

1. A multi-window display terminal device, comprising: a first display, a second display, a first camera, a second camera, a microphone, and a processor, wherein the first display and the first camera are located in a first area of the terminal device, the second display and the second camera are located in a second area of the terminal device, and the first area and the second area are located on different sides of the terminal device; and wherein the processor executes instructions to: obtain an instruction of a first user instructing to trigger a plurality of windows on the first display; display a first window and a second window on the first display in response to the instruction of the first user instructing to trigger the plurality of windows; obtain a first image by using the first camera located in the first area, and obtain a second image by using the second camera located in the second area, wherein the first image comprises the first user and a third user, and the second image comprises a second user; in response to obtaining the first image and the second image, display the first window and a third window on the first display, and display the second window on the second display; determine a first distance between the first user and the terminal device and a second distance between the third user and the terminal device based on the first image; collect a sound of the first user and a sound of the third user by using the microphone; determine, based on the sound of the first user and the sound of the third user, a language used by the first user and another language used by the third user; determine, based on the language used by the first user and the language used by the third user, that the first user corresponds to the first window and the third user corresponds to the third window; and when the first distance is greater than the second distance, and a difference between the first distance and the second distance is greater than or equal to a first threshold and less than or equal to a second threshold, reduce a size of the first window from a first size to a second size, and enlarge a size of the third window from a third size to a fourth size on the first display.

2. The terminal device according to claim 1, wherein the first display is a foldable screen comprising a first display area and a second display area, and the first display area and the second display area are determined based on a foldable axis of the first display; and
wherein the processor is further configured to:
obtain a folded state of the first display based on the foldable axis; and
display information within the first window and information within the third window in the first display area or the second display area in response to the folded state.

3. The terminal device according to claim 1, wherein the processor is further configured to:
detect a first information amount within the first window;
detect a second information amount within the third window; and
display the first window and the third window according to the following:
when the first information amount is greater than the second information amount, and a difference between the first information amount and the second information amount is greater than or equal to a third threshold, enlarge a size of the first window from a fifth size to a sixth size, and reduce a size of the third window from a seventh size to a eighth size on the first display; or
when the second information amount is greater than the first information amount, and a difference between the second information amount and the first information amount is greater than or equal to a fourth threshold, reduce a size of the first window from a ninth size to a tenth size, and enlarge a size of the third window from an eleventh size to a twelfth size on the first display.

4. The terminal device according to claim 1, wherein a sum of the second size and the fourth size is equal to a sum of the first size and the third size.

5. The terminal device according to claim 1, wherein the second size is one-third of a size of the first display, and the fourth size is two-thirds of the size of the first display; or
the second size is two-fifths of a size of the first display, and the fourth size is three-fifths of the size of the first display.

6. The terminal device according to claim 1, wherein the first camera and/or the second camera are/is (a) low power consumption camera(s); and the first image comprises profile information of the first user, and the second image comprises profile information of the second user.

7. A multi-window display method, applied to a terminal device comprising a first display, a second display, a first camera, a microphone, and a second camera, wherein the first display and the first camera are located in a first area of the terminal device, the second display and the second camera are located in a second area of the terminal device, and the first area and the second area are located on different sides of the terminal device; and wherein the method comprises: obtaining an instruction of a first user instructing to trigger a plurality of windows on the first display; displaying a first window and a second window on the first display in response to the instruction of the first user instructing to trigger the plurality of windows; obtaining a first image by using the first camera located in the first area, and obtaining a second image by using the second camera located in the second area, wherein the first image comprises the first user and a third user, and the second image comprises a second user; and in response to obtaining the first image and the second image, displaying the first window and a third window on the first display, and displaying the second window on the second display; determining a first distance between the first user and the terminal device and a second distance between the third user and the terminal device based on the first image; collecting a sound of the first user and a sound of the third user by using the microphone; determining, based on the sound of the first user and the sound of the third user, a language used by the first user and another language used by the third user; determining, based on the language used by the first user and the language used by the third user, that the first user corresponds to the first window and the third user corresponds to the third window; and when the first distance is greater than the second distance, and a difference between the first distance and the second distance is greater than or equal to a first threshold and less than or equal to a second threshold, reducing a size of the first window from a first size to a second size, and enlarging a size of the third window from a third size to a fourth size on the first display.

8. The method according to claim 7, wherein the method further comprises:
   detecting a first information amount within the first window;
   detecting a second information amount within the third window; and
   displaying the first window and the third window as follows:
      when the first information amount is greater than the second information amount, and a difference between the first information amount and the second information amount is greater than or equal to a third threshold, enlarging an size of the first window from a fifth size to a sixth size, and reducing a size of the third window from a seventh size to an eighth size on the first display; or
      when the second information amount is greater than the first information amount, and a difference between the second information amount and the first information amount is greater than or equal to a fourth threshold, reducing an size of the first window from a ninth size to a tenth size, and enlarging a size of the third window from an eleventh size to a twelfth size on the first display.

9. The method according to claim 7, wherein a sum of the second size of the first window and the fourth size of the third window is equal to a sum of the first size and the third size.

10. The method according to claim 7, wherein the second size is one-third of a size of the first display, and the fourth size o is two-thirds of the size of the first display; or the second size is two-fifths of a size of the first display, and the fourth size is three-fifths of the size of the first display.

11. The method according to claim 7, wherein the first camera and/or the second camera are/is (a) low power consumption camera(s); and the first image comprises profile information of the first user, and the second image comprises profile information of the second user.

12. A non-transitory computer-readable storage medium, wherein the non-transitory computer-readable storage medium is stores a computer program, and the computer program comprises instructions for implementing the following: obtaining an instruction of a first user instructing to trigger a plurality of windows on a first display of a terminal device; displaying a first window and a second window on the first display in response to the instruction of the first user instructing to trigger the plurality of windows; obtaining a first image by using a first camera located in a first area, and obtaining a second image by using a second camera located in a second area, wherein the first image comprises the first user and a third user, and the second image comprises a second user; and in response to obtaining the first image and the second image, displaying the first window and a third window on the first display, and displaying the second window on a second display; determining a first distance between the first user and the terminal device and a second distance between the third user and the terminal device based on the first image; collecting a sound of the first user and a sound of the third user by using a microphone; determining, based on the sound of the first user and the sound of the third user, a language used by the first user and another language used by the third user; determining, based on the language used by the first user and the language used by the third user, that the first user corresponds to the first window and the third user corresponds to the third window; and when the first distance is greater than the second distance, and a difference between the first distance and the second distance is greater than or equal to a first threshold and less than or equal to a second threshold, reducing a size of the first window from a first size to a second size, and enlarging a size of the third window from a third size to a fourth size on the first display.

13. The non-transitory computer-readable storage medium according to claim 12, wherein the first display is a foldable screen comprising a first display area and a second display area, and the first display area and the second display area are determined based on a foldable axis of the first display; and
   wherein the computer program comprises instructions for further implementing the following:
      obtain a folded state of the first display based on the foldable axis; and
      display information within the first window and information within the third window in the first display area or the second display area in response to the folded state.

14. The non-transitory computer-readable storage medium according to claim 12, wherein the computer program comprises instructions for further implementing the following:
   detecting a first information amount within the first window;
   detecting a second information amount within the third window; and
   displaying the first window and the third window according to the following:

when the first information amount is greater than the second information amount, and a difference between the first information amount and the second information amount is greater than or equal to a third threshold, enlarging a size of the first window from a fifth size to a sixth size, and reduce a size of the third window from a seventh size to an eighth size on the first display.

15. The non-transitory computer-readable storage medium according to claim 12, wherein the computer program comprises instructions for further implementing the following:
   detecting a first information amount within the first window;
   detecting a second information amount within the third window; and
   displaying the first window and the third window according to the following:
      when the second information amount is greater than the first information amount, and a difference between the second information amount and the first information amount is greater than or equal to a fourth threshold, reduce a size of the first window from a ninth size to a tenth size, and enlarge a size of the third window from an eleventh size to a twelfth size on the first display.

16. The non-transitory computer-readable storage medium according to claim 12, wherein a sum of the second size and the fourth size is equal to a sum of the first size and the third size.

17. The non-transitory computer-readable storage medium according to claim 12, wherein the second size is one-third of a size of the first display, and the fourth size is two-thirds of the size of the first display.

18. The non-transitory computer-readable storage medium according to claim 12, wherein the second size is two-fifths of a size of the first display, and the fourth size is three-fifths of the size of the first display.

19. The non-transitory computer-readable storage medium according to claim 12, wherein the first image comprises profile information of the first user, and the second image comprises profile information of the second user.

* * * * *